United States Patent
Fimoff et al.

(10) Patent No.: US 9,237,053 B2
(45) Date of Patent: Jan. 12, 2016

(54) DISCRETE MULTI-TONE SYSTEMS FOR HALF-DUPLEX IP LINKS

(71) Applicant: INTERSIL AMERICAS LLC, Milpitas, CA (US)

(72) Inventors: Mark Fimoff, Hoffman Estates, IL (US); Greg Tomezak, Buffalo Grove, IL (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 0 days.

(21) Appl. No.: 14/556,069

(22) Filed: Nov. 28, 2014

(65) Prior Publication Data

US 2015/0156051 A1    Jun. 4, 2015

Related U.S. Application Data

(63) Continuation of application No. 13/706,290, filed on Dec. 5, 2012, now Pat. No. 9,001,911.

(60) Provisional application No. 61/589,101, filed on Jan. 20, 2012.

(51) Int. Cl.

| | |
|---|---|
| *H04L 23/02* | (2006.01) |
| *H04L 27/36* | (2006.01) |
| *H04L 27/34* | (2006.01) |
| *H04L 5/00* | (2006.01) |
| *H04L 27/26* | (2006.01) |
| *H04L 1/00* | (2006.01) |

(52) U.S. Cl.
CPC .............. *H04L 27/36* (2013.01); *H04L 1/0045* (2013.01); *H04L 1/0057* (2013.01); *H04L 1/0071* (2013.01); *H04L 5/003* (2013.01); *H04L 5/0007* (2013.01); *H04L 5/0046* (2013.01); *H04L 27/2608* (2013.01); *H04L 27/34* (2013.01); *H04L 1/0054* (2013.01)

(58) Field of Classification Search
CPC ........ H04L 27/34; H04L 27/38; H04L 5/0007
USPC ................... 375/261, 260, 267, 340; 714/751
See application file for complete search history.

(56) References Cited

U.S. PATENT DOCUMENTS

| | | | |
|---|---|---|---|
| 6,512,789 B1 * | 1/2003 | Mirfakhraei | .................. 375/229 |
| 6,535,553 B1 | 3/2003 | Limberg et al. | |
| 2002/0015421 A1 | 2/2002 | Abbas et al. | |
| 2003/0152155 A1 | 8/2003 | Peeters | |
| 2006/0083322 A1 | 4/2006 | DesJardins et al. | |

(Continued)

*Primary Examiner* — Khai Tran
(74) *Attorney, Agent, or Firm* — Loza & Loza, LLP; Anthony G. Smyth

(57) ABSTRACT

A DMT system for a half-duplex two-way link carries Internet protocol encoded video stream on a coaxial cable that also carries a baseband rendition of the same video stream. A plurality of downlink symbols modulated on a subband of subcarriers in a downlink signal are decoded. The symbols may carry data encoded on a subband using a constellation of QAM symbols assigned to the subband. Other subbands may be associated with different QAM constellations. Lower-order constellations of QAM symbols may be assigned to subbands that include higher-frequency subcarriers and higher-order constellations of QAM symbols may be assigned to subbands that include lower-frequency subcarriers. A block error correction decoder may be synchronized based on an identification of the first constellation of QAM symbols and information identifying boundaries between the plurality of downlink symbols.

19 Claims, 32 Drawing Sheets

(56) References Cited

U.S. PATENT DOCUMENTS

| | | | |
|---|---|---|---|
| 2007/0047633 A1* | 3/2007 | Tung et al. | 375/222 |
| 2007/0201574 A1* | 8/2007 | Wu et al. | 375/261 |
| 2009/0216489 A1 | 8/2009 | Mahadevan et al. | |
| 2010/0322348 A1 | 12/2010 | Tomezak et al. | |
| 2011/0134975 A1* | 6/2011 | Ahrndt | 375/220 |
| 2011/0264978 A1 | 10/2011 | Pons et al. | |

* cited by examiner

DISCRETE MULTI-TONE SYSTEMS FOR HALF-DUPLEX IP LINKS

CROSS-REFERENCE TO RELATED APPLICATION(S)

This application is a continuation of, and claims benefit of priority from U.S. patent application Ser. No. 13/706,290, filed on Dec. 5, 2012, and which claimed the benefit of U.S. Provisional Application Ser. No. 61/589,101, entitled "Discrete Multi-tone Systems And Methods For Half-Duplex IP Links" which was filed on Jan. 20, 2012, and both of these applications are expressly incorporated by reference herein in their entirety.

DETAILED DESCRIPTION OF THE INVENTION

Figure 1:
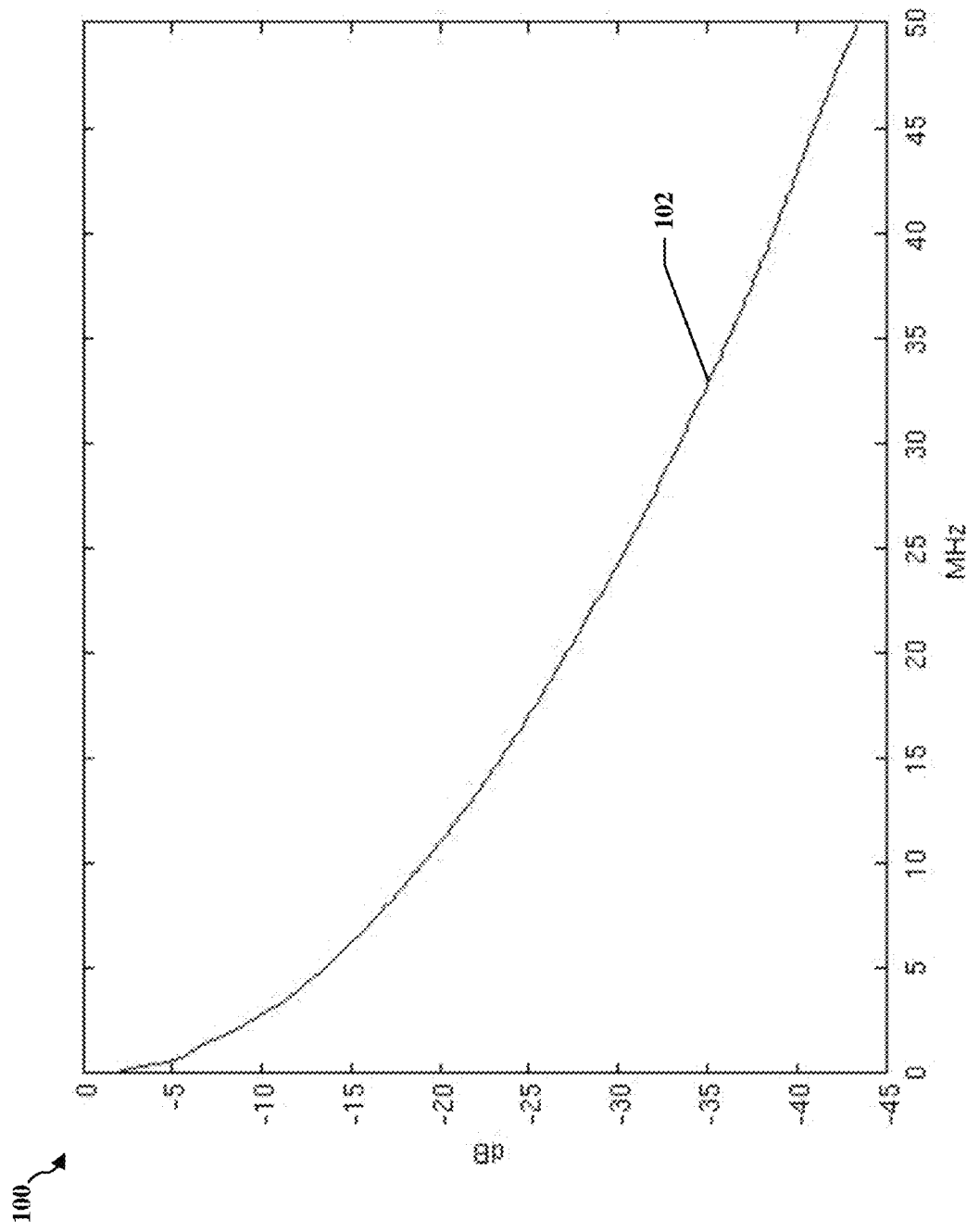
FIG. 1 illustrates frequency response of 2000 feet of RG-59 cable.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the descriptions herein are intended to encompass other embodiments including a plurality of the same component, and vice-versa, unless explicitly stated otherwise. Moreover, applicants do not intend for any term in the specification or claims to be ascribed an uncommon or special meaning unless explicitly set forth as such. Further, embodiments of the present invention encompass present and future known equivalents to the components referred to herein by way of illustration.

As described herein, a first generation security link over coax (SLOC) may be characterized as a full-duplex, single-carrier, point-to-point, 2-way digital video over IP link with concurrent and/or simultaneous transmission of analog composite video in the downstream direction, blanking, and sync (CVBS) over coaxial cable for security applications. In one example, a first generation SLOC system may provide a downstream bit rate of 36 megabits per second (Mbps) from camera to monitor and/or digital video recorder (DVR) over 1000-1500 feet of low-cost RG-59 cable. Advanced Internet protocol (IP) cameras can output data at significantly higher bit rates which can extend beyond 36 Mbps.

Certain embodiments of the invention employ a discrete multi-tone (DMT) system in a half-duplex, bidirectional IP data link to provide a next-generation SLOC. In the downstream direction (camera to DVR), Internet protocol data (usually compressed digital video) may be transmitted in combination with CVBS. Internet protocol acknowledge packets may be sent in the upstream (DVR to camera) direction. The next generation SLOC system can support 100 Mbps downstream and 6.25 Mbps upstream over at least 2000 feet of low cost RG-59 cable with the bit rate automatically adaptively reduced as the cable gets longer. At 3000 feet a bit-rate of 52.3 Mbps downstream and 3.26 Mbps upstream can be achieved. An upstream link may be provided from monitor and/or DVR to the camera. Simultaneous CVBS transmission in the downstream direction may be accommodated by zeroing the digital spectrum in the range of DC to 11 MHz, for example.

A simple and effective bit-loading (BL) method can be used to exploit the cable channel capacity. The BL method allows the system to overcome the substantial frequency tilt in long sections of cable (see FIG. 1), resulting in a high bit rate and/or long cable reach. A data framing method disclosed herein, closely coupled with the BL method, Reed-Solomon packetization (or the like) and byte interleaving, may be used to map the input data to the modulation in a manner that provides for simple synchronization of deinterleaving and decoding components in a receiver. The decoding components may comprise a block-error correcting decoder, such as the Reed-Solomon decoder described herein. Synchronization may operate in a consistent manner regardless of bit-loading assignments. Controlled clipping of the up-sampled signal at the transmitter may reduce the peak-to-average power ratio and may improve transmitted SNR, while limiting the generation of in-band noise. Raised-cosine windowing of the up-sampled signal controls out-of-band noise to prevent digital interference into the CVBS signal, using techniques and methods known in the art. Use of a small number of moving pilots allows for effective channel estimation, enabling tracking digital adaptive equalization for the DMT signal. The DMT channel estimator may be used to estimate the frequency tilt in the CVBS band. This information can be used to enable effective analog or digital equalization of the CVBS signal. A low-noise AFE is described that enables certain systems to meet performance goals.

FIG. 1 is a graph 100 showing a typical frequency response for 2000 feet of RG-59 cable. In a single-carrier system, all transmitted digital quadrature amplitude modulation (QAM) symbols are typically members of the same constellation set. For high bit rates, high-order constellations may be needed to encode more bits of information per symbol. High-order constellations in turn require relatively high receiver SNRs for reliable reception. The substantial high-frequency attenuation makes this difficult to achieve in conventional systems. If the constellation order is reduced, however, a yet wider signal bandwidth may be needed with greater attenuation occurring at the high end of the enlarged signal band.

Certain embodiments employ DMT (baseband multicarrier) modulation, in which a signal comprises a set of subcarriers. Each of a plurality of subbands of the subcarriers may be modulated by QAM symbols from a constellation selected for, and/or matched to the subband. Lower-frequency subcarriers typically suffer less attenuation than higher frequency subcarriers, and lower-frequency subcarriers are typically received with a higher post-analog front-end (AFE) signal-to-noise ratio (SNR) than are the higher-frequency subcarriers. Accordingly, lower-frequency subcarriers can reliably support higher-order constellations. To provide reliable reception of the higher-frequency subcarriers, the higher-frequency subcarriers are modulated by symbols from lower-order constellations. With this arrangement, the lower-frequency subcarriers can support a higher bit rate per subcarrier than do the higher-frequency subcarriers. Overall, this scheme allows the system to achieve a bit-rate/reliability trade-off that approaches more closely the channel capacity in than can be practically achieved with a single-carrier system.

Figure 2:
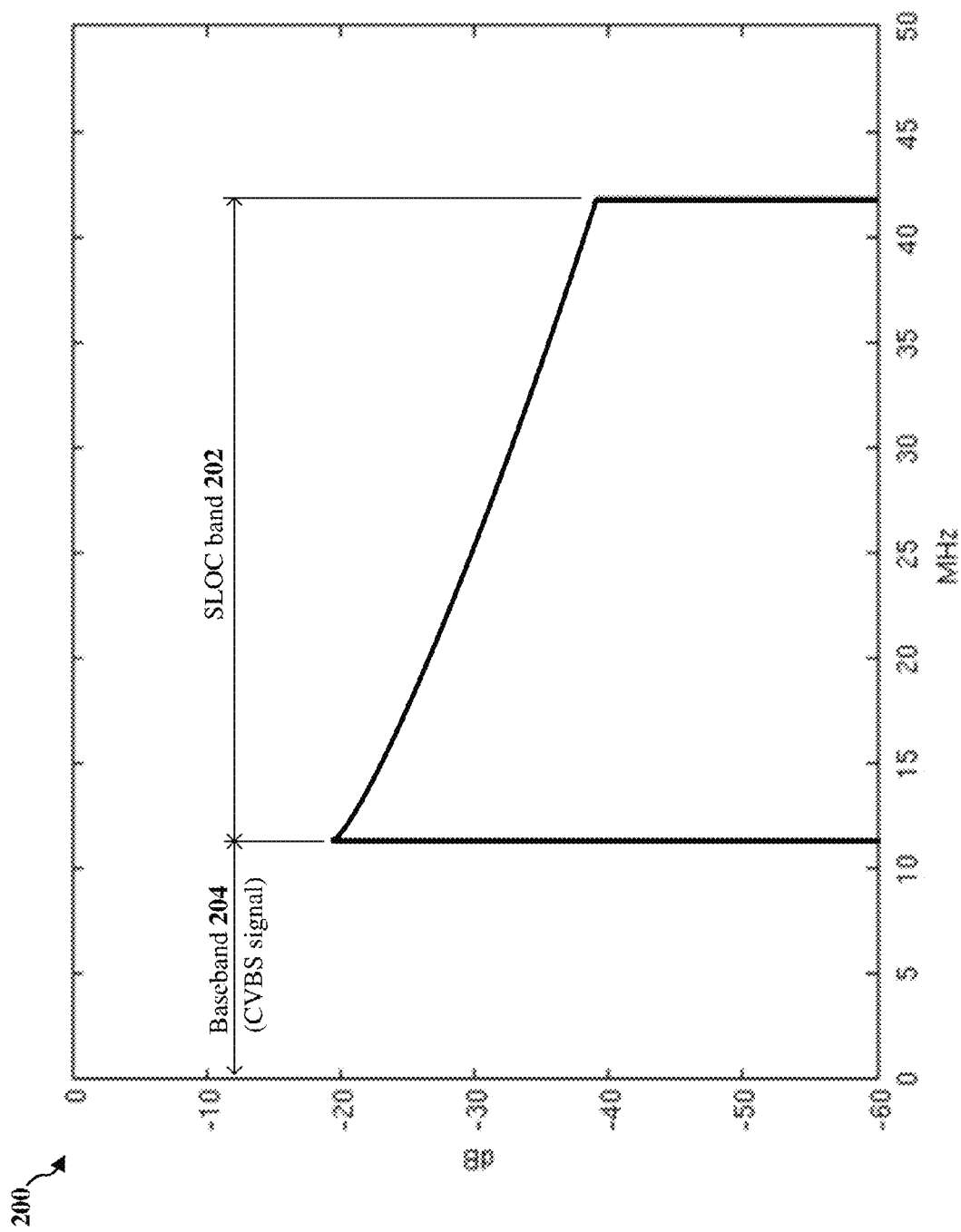
FIG. 2 illustrates frequency tilt over 2000 feet of RG-59 cable in a signal band used in certain embodiments of the invention.

FIG. 2 is a graph 200 showing a typical frequency response for 2000 feet of RG-59 cable for a subset of bandwidth 202 corresponding to a SLOC digital signal. The band of frequencies 202 in a SLOC digital signal can extend from about 11 MHz to about 42 MHz and, as shown in the graph 200, a 2000-foot length of RG-59 cable can cause about 20 dB of tilt across this band 202. While some embodiments may provide different constellation assignments on an individual subcarrier basis, good performance for SLOC over coaxial cable can be achieved with less granularity in constellation assignment. The baseband 204, shown as between 0 Hz and 11 MHz, may be reserved for carrying a simultaneous analog video signal. The baseband signal may be equalized at the receiver to correct for phase shifts and attenuation.

Figure 3:
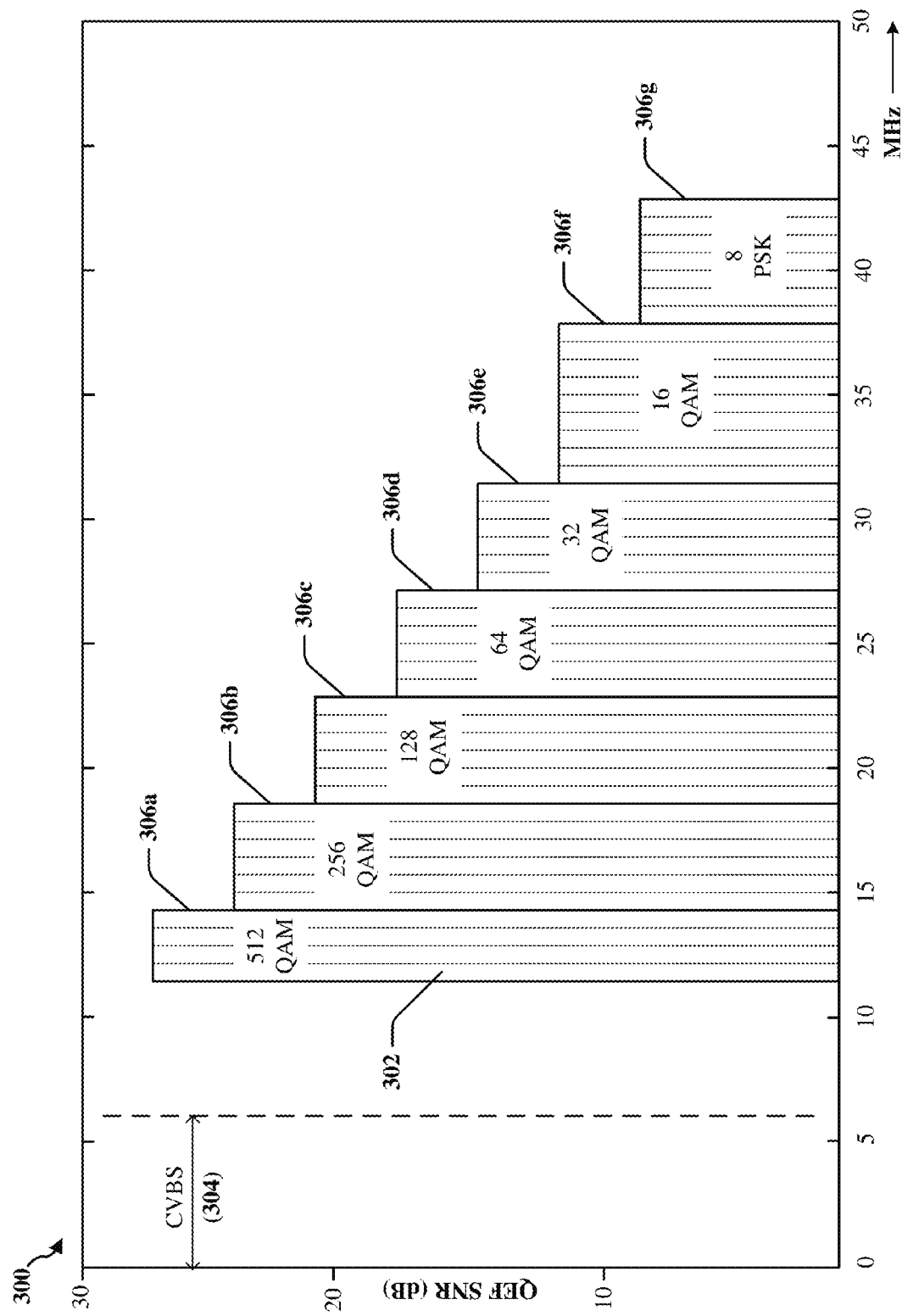
FIG. 3 is a frequency distribution chart illustrating an example of constellation to subband assignment according to certain aspects of the invention.

FIG. 3 is a chart 300 illustrating an example of constellation assignment for a specific example of subband configuration. In the example, available bandwidth in a signal is divided into 44 subbands, as illustrated by subband 302 for example. In the example, the available bandwidth excludes CVBS bandwidth 304. The subbands may be of equal bandwidth and may comprise an integer number of adjacent subcarriers. Subbands may be divided into groups 306a-306g and QAM constellations may be assigned to the groups 306a-306g. The groups 306a-306g may comprise different numbers of subbands. In the example depicted in FIG. 3, each subband in group 306a is assigned a 512 QAM constellation, each subband in group 306b is assigned a 256 QAM constellation, each subband in group 306c is assigned a 128 QAM constellation, each subband in group 306d is assigned a 64 QAM constellation, each subband in group 306e is assigned a 32 QAM constellation, each subband in group 306f is assigned a 16 QAM constellation and each subband in group 306b is assigned a 8 phase shift keying (PSK) constellation.

Certain embodiments using the QAM constellations assigned per FIG. 3, may additionally use punctured trellis coded modulation to transmit Reed-Solomon-coded data can result in quasi-error-free (QEF) SNR thresholds at the receiver trellis decoder input that range from 37.8 dB for 512 QAM to 8.8 dB for 8 PSK. In the chart 300, y-axis value (height) of each group 306a-306g indicates its respective QEF threshold. This span of SNR thresholds closely approximates the cable tilt and each group 306a-306g can have approximately the same SNR margin at the receiver. QAM constellations may be automatically assigned to groups 306a-306g using any appropriate or adaptive processes and certain well-known techniques may produce near-optimal results in terms of approaching channel capacity given the coding and modulation utilized in a system.

Figure 4:
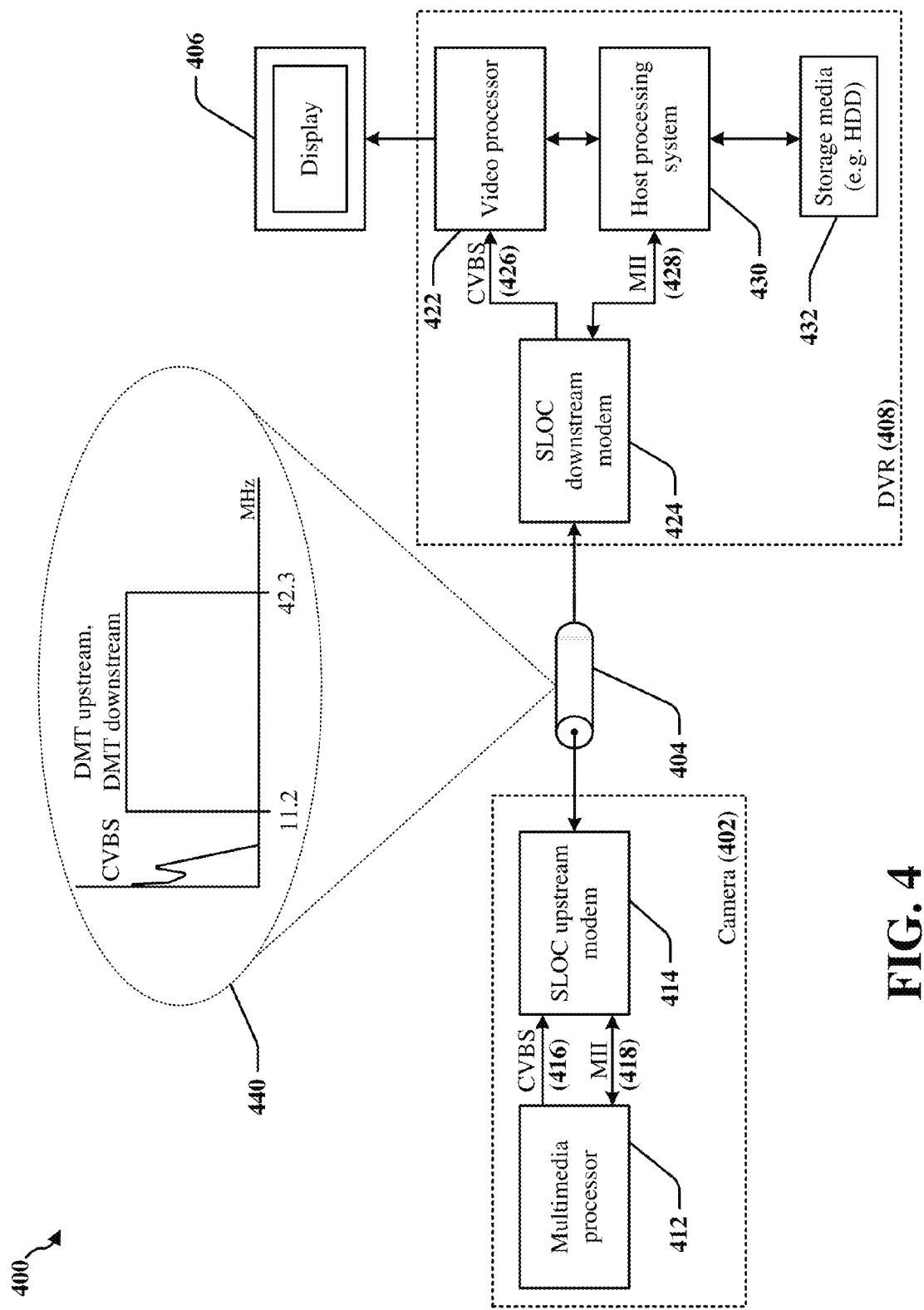
FIG. 4 is a schematic drawing and a spectral occupancy chart illustrating one example system according to certain aspects of the invention.

FIG. 4 is diagram 400 illustrating a SLOC system according to certain aspects of the present invention. A SLOC-equipped camera 402 may be connected by coaxial cable 404 to a SLOC-equipped digital video recorder DVR 408 or other receiving equipment such as video servers and video routers, etc. SLOC-equipped camera 402 comprises a modem 414 that transmits one or more signals representative of a video stream generated or otherwise processed and/or relayed by multi-media processor 412. The one or more signals may include an analog CVBS signal 416 transmitted as a baseband signal, and a concurrently transmitted digital DMT signal 418 occupying the band from 11.2 MHz to 42.3 MHz which carries data supplied by a media independent interface (MII), as illustrated graphically at 440. The DMT signal accommodates the MII internet protocol signal 418 that typically carries compressed high definition digital video in the downstream direction to the DVR at nominal rates of up to 100 Mbps. The CVBS signal 416 may carry a standard definition version of the compressed high definition digital video carried in the DMT signal.

The DVR 408 may also comprise a modem 424 that receives and separates a signal received from the coaxial cable 404 into a received CVBS signal 426 and a received downstream DMT signal portion of MII 428. The received downstream DMT signal is decoded and passed via an MII interface to a host processor 430 which decodes, or causes to be decoded, the compressed digital high definition video in the MII signal 428. Modem 424 may also transmit an upstream DMT signal which carries return data from the MII signal 428. The upstream DMT signal may be transmitted in a half-duplex manner at bit rates of up to 6.25 MHz. The upstream DMT signal may encode an audio feed, camera control information and/or other information, such as messages required to maintain an Internet protocol connection between the upstream camera 402 and downstream DVR 408 or other devices. In one example, the upstream DMT signal occupies the frequency band from 11.07 MHz to 43.19 MHz, which is nearly the same as the frequency band used by the downstream DMT signal.

Figure 5:
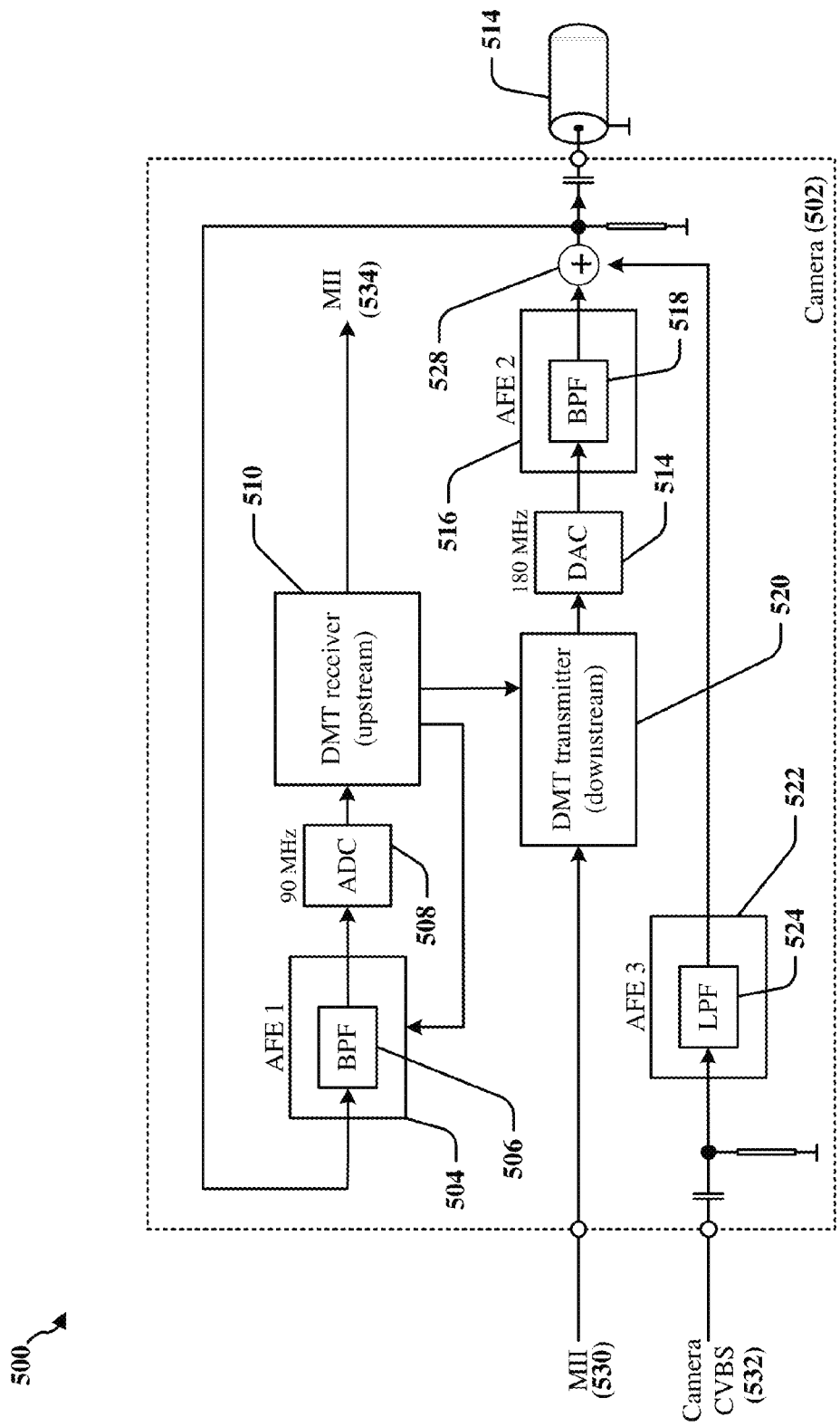
FIG. 5 is a schematic illustrating a camera side modem according to certain aspects of the invention.
Figure 6:
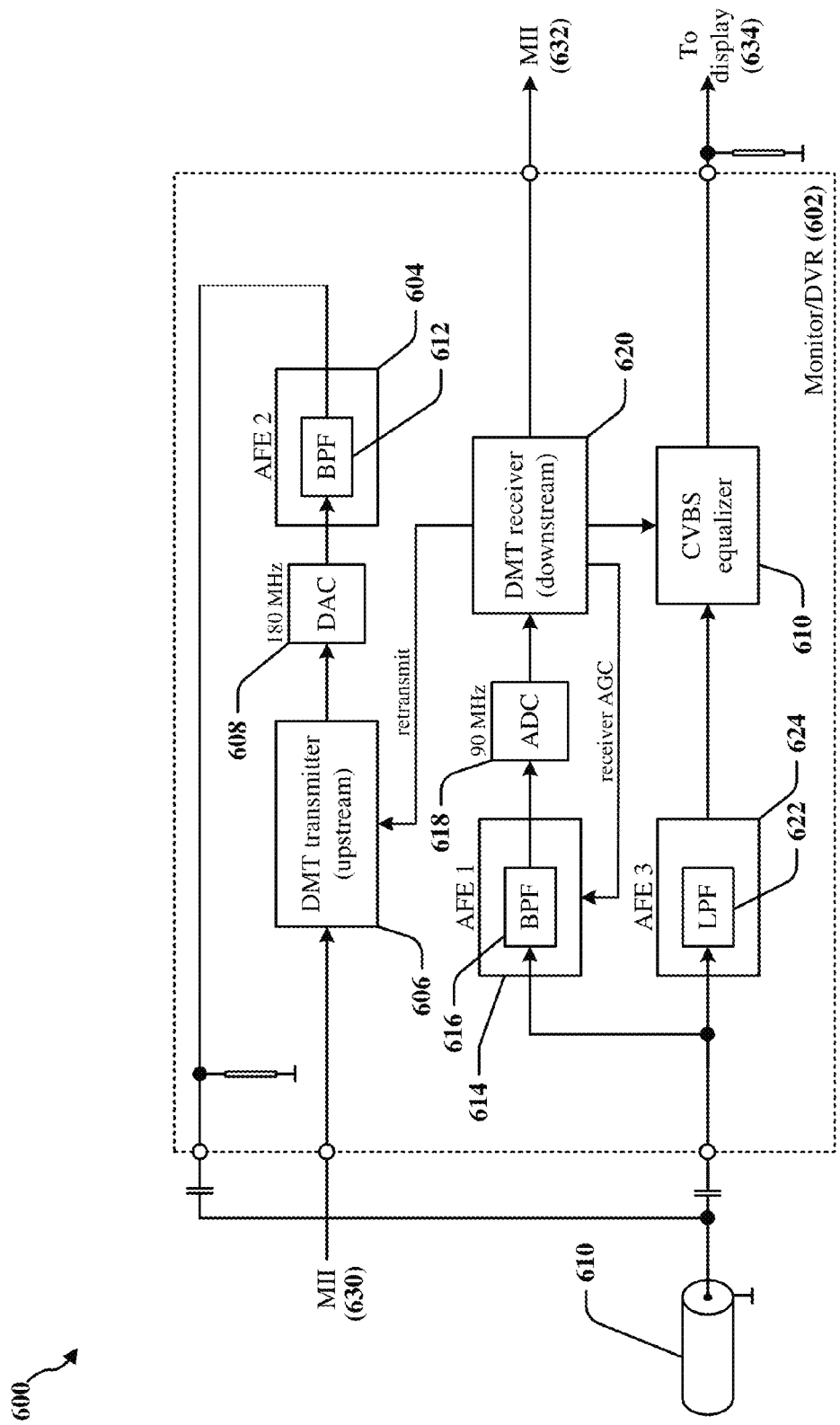
FIG. 6 is a schematic illustrating a DVR example of a downside side modem according to certain aspects of the invention.

FIGS. 5 and 6 include schematics 500 and 600 respectively, which present high-level views of camera side SLOC modem 502 and DVR side SLOC modem 602. Camera side modem 502 receives an IP MII signal 530 which is fed to downstream DMT transmitter 520. DMT transmitter 520 may provide a nominal 100 Mbps output to digital-to-analog converter (DAC) 514, which converts the signal to an analog signal and is combined with the camera's CVBS signal 532 in adder 528. Adder 528 may drive the combined signal onto the cable 514. AFE 516 includes a band pass filter ("BPF") 518 to reduce interference added into the CVBS at the low end and to suppress the DMT image at the high end. The lower bit rate upstream DMT signal can be received from the cable 514 and fed to camera side DMT receiver 510 for decoding. AFE 504 may comprise a band pass filter (BPF) 506 attenuates the CVBS signal while passing the upstream DMT signal before providing the DMT signal for digitization by analog-to-digital converter (ADC) 508. An output of DMT receiver 510 may be provided to the MII interface 534.

At the DVR side SLOC modem 602, the combined CVBS/DMT signal received from cable 610 is fed to AFEs 604, 614, and 624. AFE 614 filters out most of the CVBS and feeds the filtered DMT signal to the downstream DMT receiver 620 after digitization by ADC 618. In the CVBS signal path, the LPF of AFE 624 filters out most of the DMT signal. In some embodiments, an ADC, digital LPF, and DAC can be inserted for further DMT suppression. AFE 604 has a post-DAC 608 BPF 612 similar to BPF 518 of the camera side modem 502. An analog CVBS equalizer 610 provides compensation for high-frequency roll-off attributable to the cable. Return packets emanating from the host MII interface are transmitted upstream by the upstream DMT transmitter 606, which is structurally similar to the downstream DMT transmitter 520, but may be configured with different operating parameters as appropriate or desired. DAC 608 converts the upstream DMT signal to an analog signal for transmission through AFE 604, which includes BPF 612.

SLOC DMT Transmitter

Figure 7:
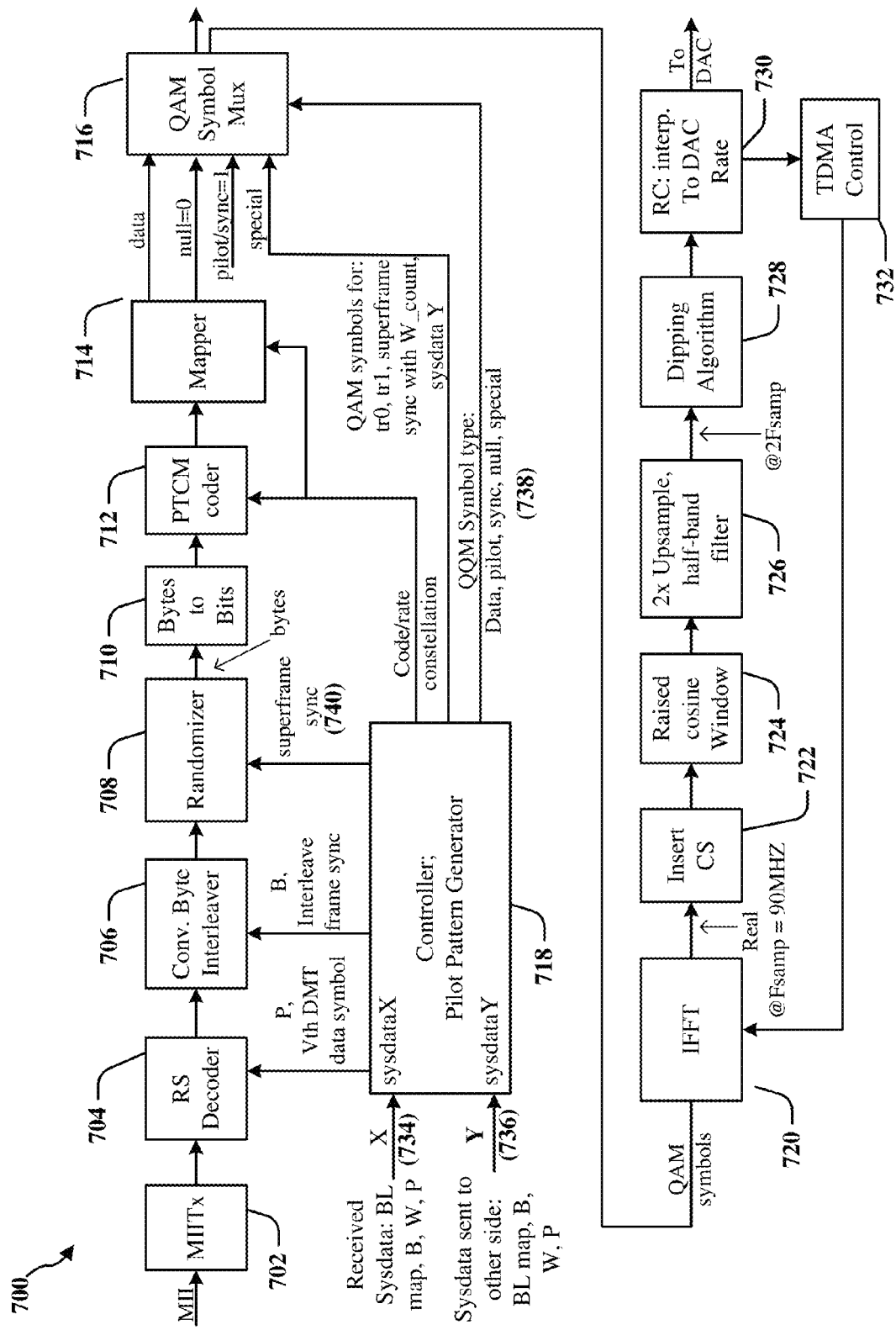
FIG. 7 is a schematic illustrating a DMT transmitter according to certain aspects of the invention.
Figure 8:
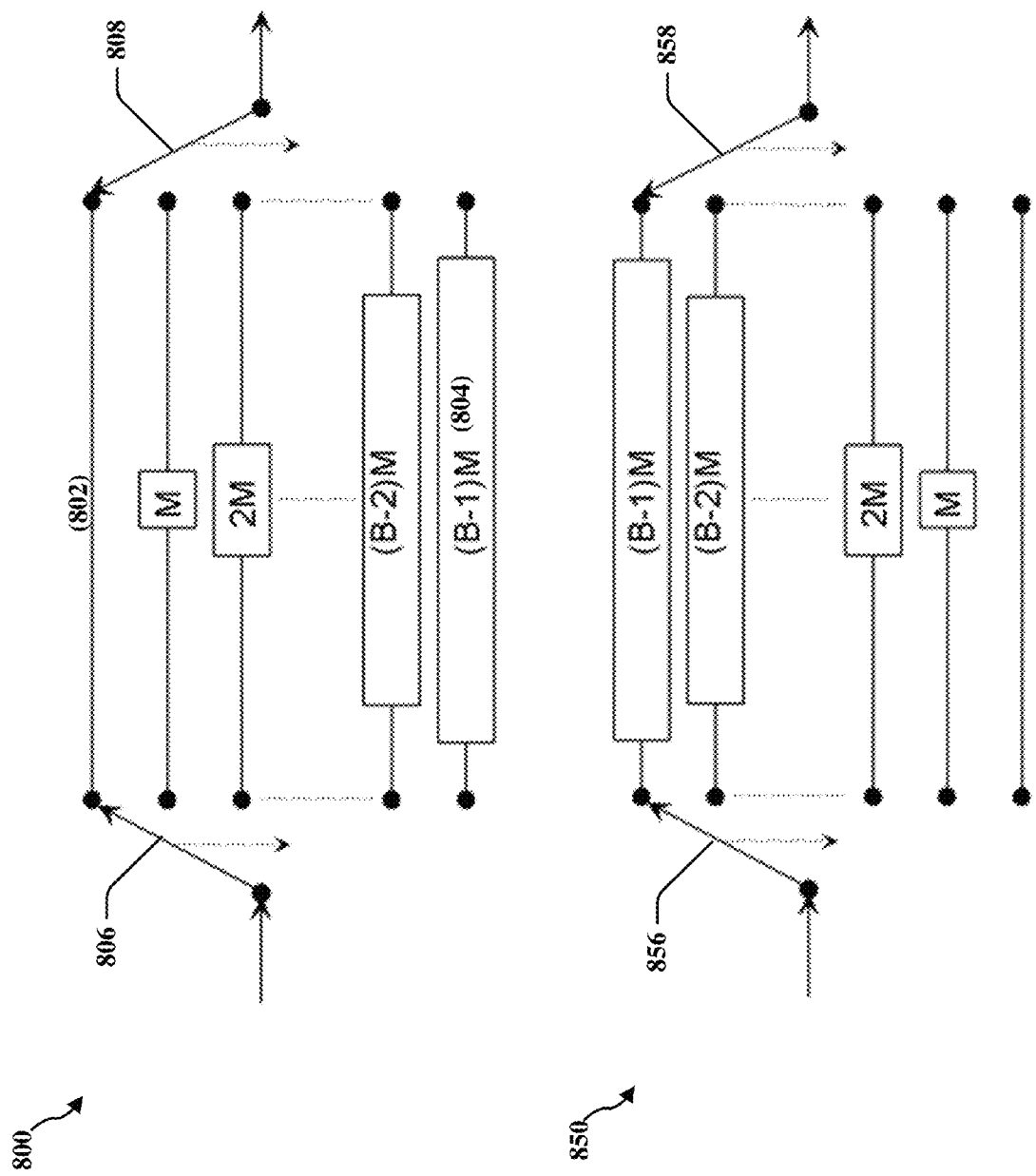
FIG. 8 is a diagram illustrating an interleaver and a deinterleaver.

FIG. 7 is a block schematic 700 that illustrates a DMT transmitter according to certain aspects of the invention. An MII transmit interface (MIITx) 702 receives the MII data. Data from the MIITx is formed into bytes and then into packets of size k bytes at the input to a Reed-Solomon (RS) coder 704, which calculates and appends r=24 parity bytes to the packet. The resulting packet size P=k+24 can vary according to the subcarrier constellation assignments in a manner to be described later. Up to t=r/2=12 corrupted bytes per packet can be corrected at the receiver. The RS coder output is then processed by a convolutional byte interleaver 706. FIG. 8 illustrates an implementation 800 of interleaver 706. Interleaver 706, along with a complimentary deinterleaver 850 in the SLOC receiver 620, may be used in any suitable manner s known in the art, and may be configured to combat impulse noise affecting the transmitted signal. This impulse noise can couple into the system through a power line, or from the very long lengths of coaxial cable, which can pick up electrical noise even though the coax cable is shielded. Such impulse noise can cause IP packet loss.

According to certain aspects of the invention, a noise impulse having a duration of one "package" can be tolerated, where the content and size of the package is discussed in more detail below. Structures 800 and 850 comprise B shift registers of increasing size. For interleaver 800, the topmost shift register 802 has length zero, and the bottommost shift register 804 has length (B−1) M bytes where M is typically a small integer, and typically BM≥P. For both the interleaver 800 and deinterleaver 850, a synchronization signal may be needed to force input commutator 806 and output commutator 808 to the top position at the same point in the byte stream, and to synchronize the interleaving to the deinterleaving. This synchronization is discussed in more detail elsewhere herein. The input and output commutators 806, 808 move down one position as a byte enters the interleaver and a different byte exits the interleaver. When the commutators 806, 808 reach the bottom, they shift back to the top. The RS coder 704/interleaver 706 combination allows a corresponding deinterleaver/RS decoder in the receiver to correct data corrupted by noise impulses of duration Bt bytes.

Figure 9:
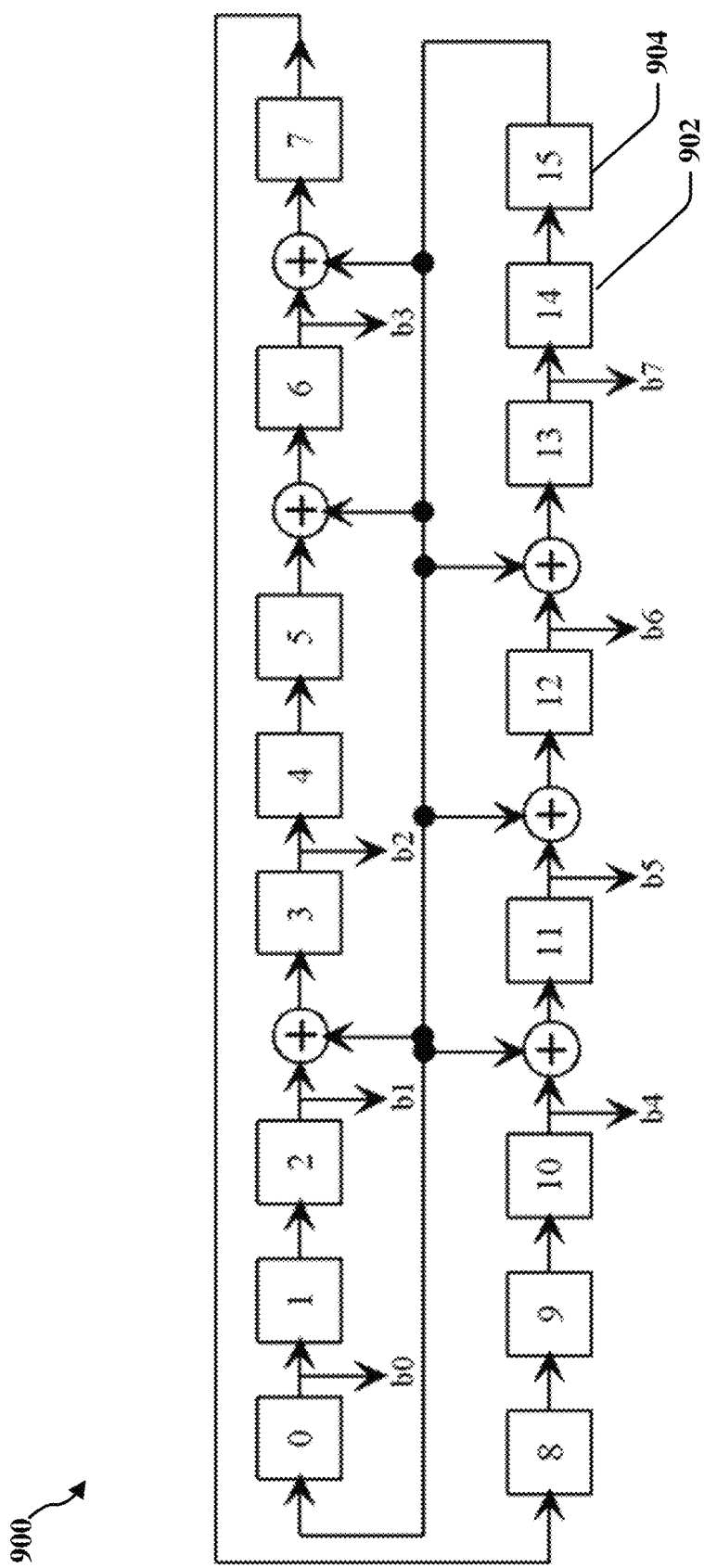
FIG. 9 is a randomizer according to certain aspects of the invention.

Output bytes of interleaver 706 are then randomized by randomizer 708 to ensure a uniform distribution of QAM symbols. FIG. 9 shows an example of a downstream randomizer 708 based on the polynomial:

$$x^{16}+x^{13}+x^{12}+x^{11}+x^7+x^6+x^3+x+1$$

In the example described herein, the upstream randomizer is the same as the downstream randomizer 708, except that the $14^{th}$ and $15^{th}$ stages 902 and 904 are removed.

Figure 10:
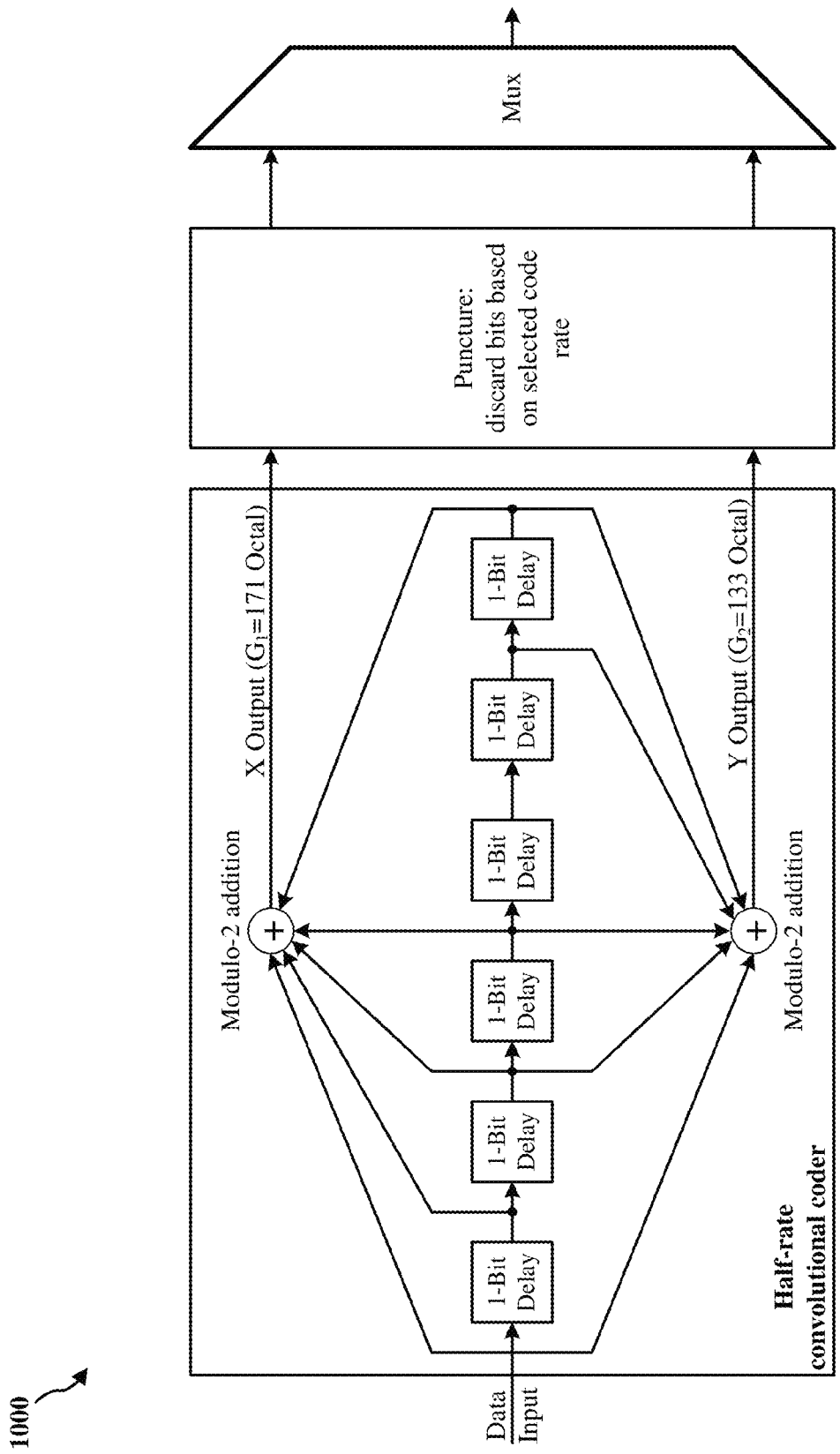
FIG. 10 is a schematic illustrating a punctured trellis code modulator according to certain aspects of the invention.

The data is then encoded using punctured trellis code modulation (PCTM). FIG. 10 is a diagram 1000 illustrating a PTCM coder 712. The PTCM coder encodes m−1 bits at a time from the randomizer into m bits. The code may be based on a ½ rate mother code. Bits output by the ½ rate coder may then be deleted (punctured) according to a specified pattern to produce higher rate (m−1)/m rate codes. The quantity m may range from m=2 for 4-QAM symbols to m=9 for 512-QAM symbols. The QAM constellation number is given by 2 m. The assignment of a particular QAM constellation to a particular DMT subband of subcarriers (the selection of m) is discussed in more detail below.

Figure 11:
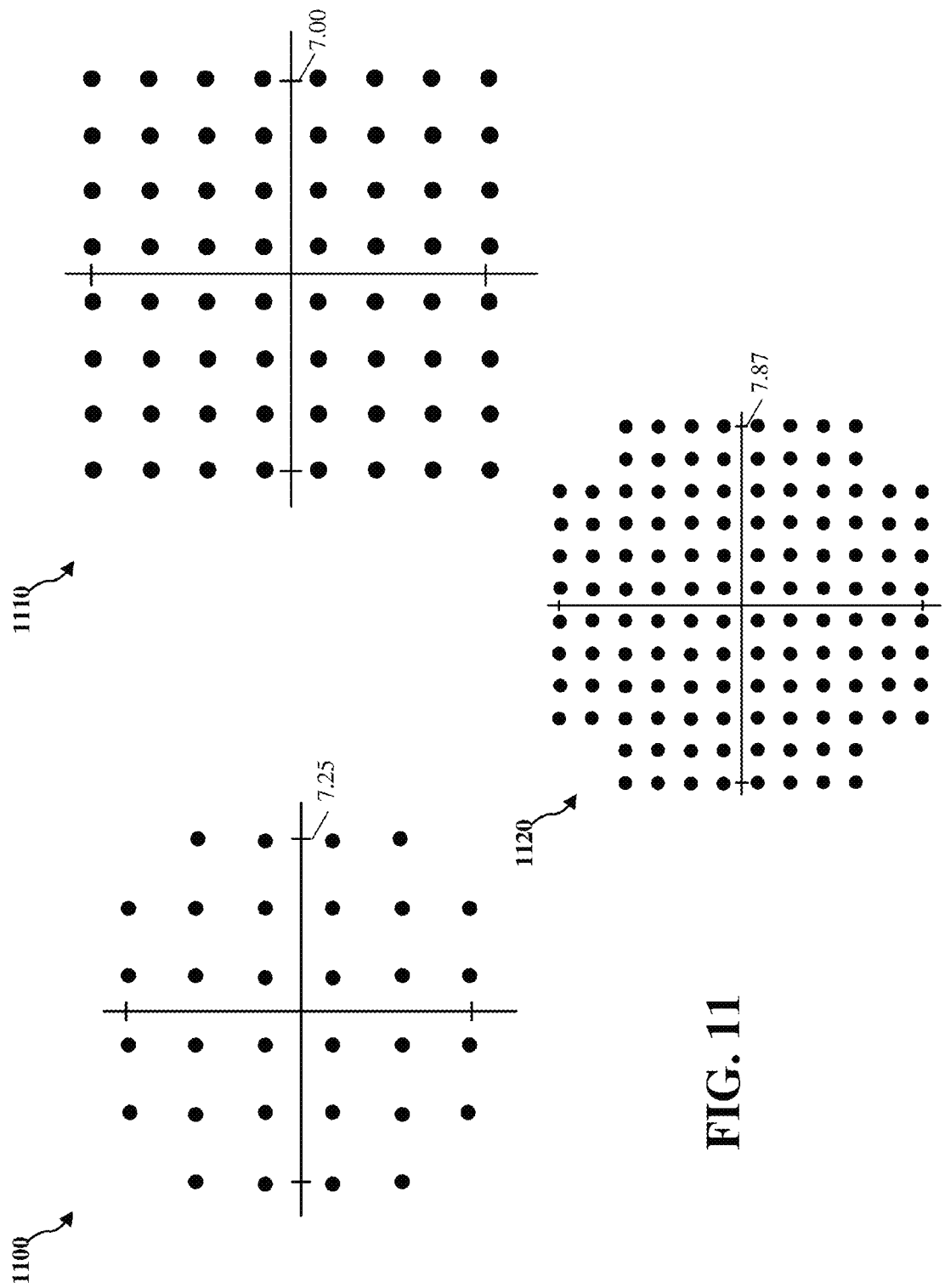
FIG. 11 is a schematic illustrating QAM constellations.

The m data bits are then mapped by mapper 714 to points in the selected $2^m$ QAM constellation. The 256-, 64-, 16- and 4-point constellations are square. The 128- and 32-point constellations are cross constellations. These constellations may be scaled so that all have the same average power, assuming a uniform distribution of symbols. FIG. 11 shows three possible constellations 1100, 1110 and 1120 plotted in the complex plane. Complex QAM data symbols are fed to the QAM symbol multiplexer (mux) 716. The mux 716 may also input fixed-level BPSK timing sync and pilot symbols, which are multiplexed with the QAM data symbols, all of which are assigned to certain DMT subcarriers within each DMT data symbol.

The mux 716 periodically inserts a superframe DMT sync symbol at regular intervals via the special input from module 718. This DMT symbol may comprise subcarriers modulated by a specific uncoded binary phase shift keyed (BPSK) pseudorandom number (PN) sequence which is easily detectable by the receiver. This enables receiver synchronization of certain processes that will be discussed later. Just after the DMT superframe sync symbol, either two (upstream) or one (downstream) DMT system data (sysdata) symbols are inserted, also via the special input from module 718. These symbols carry the constellation to subcarrier assignments and other critical parameters and information. The contents and structure of the DMT sysdata symbols are also further discussed elsewhere in this disclosure.

During system start-up, a series of DMT symbols that comprise only un-coded BPSK training symbols derived from two other PN sequences (tr0, tr1) are transmitted to assist receiver timing synchronization and initial channel estimation. Details of system start-up are discussed herein below.

DMT Modulation Parameters

As a first step in the downstream DMT modulation, a 4 k-point real output of IFFT 720 is obtained by creating a complex conjugate input sequence from a 2 k-long input data block. The upstream transmitter may utilize a 512-point real output IFFT. The nominal sample frequency is $F_s$=90 MHz. A 2 μs (180 samples) cyclic suffix (CS) is appended to the IFFT output vector to form one DMT symbol. The CS allows the receiver to resist inter-DMT-symbol interference and greatly simplifies digital equalization. The resulting DMT parameters are shown in Table 1.

TABLE 1

|  | IFFT size | symbol time with CS in μs | samples per DMT sym | bin width Hz |
|---|---|---|---|---|
| downstream | 4096 | D*/2 = 47.51 | 4276 | 21972.66 |
| upstream | 512 | U* = 7.69 | 692 | 175781.25 |

Cable propagation delay results in added overhead in a half-duplex system. For 1000 meters of cable, the one-way delay (OWD) is about 5 μs. With some added safety margin, an allowance for a maximum OWD of 6 μs (540 samples) is made, or a round-trip delay (RTD) of 12 μs. The half-duplex operation is illustrated in the timing chart 1200 of FIG. 12, as viewed from the camera side and DVR side of the cable. The line alternates between two DMT symbols 1202, 1204 sent downstream and one DMT symbol 1206 sent upstream. Each of D1 1202, D2 1204 and D3 1208 represents a pair of downstream DMT symbols of duration 2×47.51 μs=95.02 μs. Each of U1 1206 and U2 1210 is a single upstream DMT symbol of duration 7.69 μs. The combination of two downstream symbols followed by one upstream symbol and the intervening space is referred to herein as a "package."

In one example, 2048 downstream subcarriers are assigned as follows null subcarriers providing a hole for CVBS:
0-509 (510 subcarriers, 0-11.20 MHz)

useful subcarriers:
510-1923 (1414 subcarriers)

null subcarriers to prevent aliasing (guard bands):
1924-2047 (124 subcarriers), about 6% of DMT band Of the useful subcarriers, four are permanently modulated with a fixed BPSK symbol and utilized to assist receiver timing synchronization. These are subcarriers 1025, 1041, 1057, and 1073. Two pilot subcarriers modulated with a fixed BPSK symbol are also utilized to assist receiver equalization. This pair of subcarrier frequencies change for each DMT symbol according to a known pattern, rotating or otherwise circulating through all the even useful subcarriers as well as odd subcarrier 1923. This leaves 1408 subcarriers available to carry IP data.

In one example, 512 upstream subcarriers are assigned as follows:

null subcarriers providing a hole for CVBS:
0-62 (63 subcarriers, 0-11.07 MHz)

useful subcarriers:
63-239 (177 subcarriers)

null subcarriers to prevent aliasing:
240-255 (16 subcarriers), about 6% of DMT band Of the useful subcarriers, one is used for a moving pilot subcarrier modulated with a fixed BPSK symbol that aids receiver equalization. This subcarrier frequency changes for each DMT symbol according to a known pattern, rotating or otherwise circulating through all the useful subcarriers. The remaining 176 subcarriers are available to transmit IP data.

Figure 12:
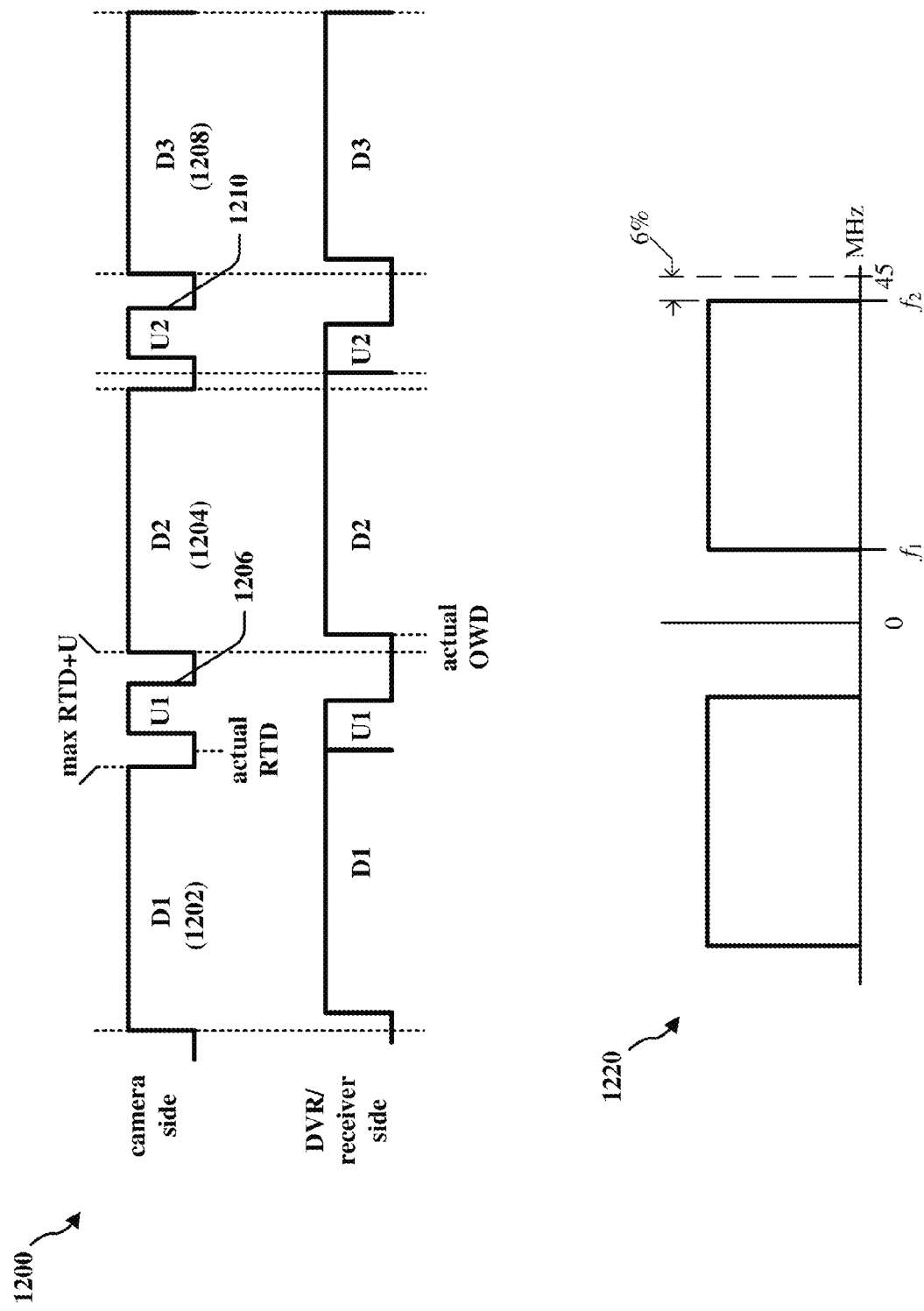
FIG. 12 is a schematic illustrating half-duplex operation and DMT spectrum according to certain aspects of the invention.

The resulting ideal DMT spectrum 1220 is shown in FIG. 12. For the downstream signal, $f_1$=11.20 MHz and $f_2$=42.28 MHz. For the upstream signal, $f_1$=11.07 MHz and $f_2$=42.19 MHz.

DMT Modulation Description

For IFFT: Let A[n] be the mth N-length vector of QAM symbols at the input to the N-point IFFT module of FIG. 8. Let that vector be given by $$A[m] = \left[ A_{-\frac{N}{2}}[m] A_{-\frac{N}{2}+1}[m] \ldots \ldots A_{\frac{N}{2}-1}[m] \right].$$

Then the IFFT efficiently computes the vector $$x[m] = \left[ x_{-\frac{N}{2}}[m] x_{-\frac{N}{2}+1}[m] \ldots \ldots x_{\frac{N}{2}-1}[m] \right]$$

where $$x_k[m] = \frac{1}{\sqrt{N}} \sum_{n=-N/2}^{N/2-1} A_n[m] e^{\frac{j2\pi kn}{N}},$$

$$k = \frac{-N}{2}, \frac{-N}{2}+1, \ldots, \frac{N}{2}-1.$$

Note that A[n] is conjugate symmetric, i.e.

$$A_{-n}[m] = A_n^*[m],$$

$$n = 1, 2, \ldots, \frac{N}{2}-1,$$

and $$A_{-\frac{N}{2}} = A_0 = 0.$$

Therefore, vector x[m] is real.

The downstream 4096-point decimation in time (DIT) IFFT comprises six radix-4 stages. The upstream 512-point DIT IFFT is composed of four radix-4 stages followed by one radix-2 stage. IFFT/FFT architecture is discussed further in the description of the DMT receiver. Note that due to the operation of the DIT IFFT, the input QAM symbol stream is modulated by subcarriers numbered in bit-reversed order. Hence, a bit-loading table is accessed to assign the correct constellation to the current subcarrier. The IFFT output is in normal subcarrier order.

The system may have a module 722 that inserts a cyclic suffix (CS). For convenience the IFFT output vector may be re-indexed as follows $$[x_0[m] x_1[m] \ldots x_{N-1}[m]]$$

In some embodiments, a CS of $N_{CS}=180$ samples (2 μs) is appended to the IFFT output vector. This is given as $$x_{ext}[m]=[x_0[m]x_1[m] \ldots x_{N-1}[m]x_0[m]x_1[m] \ldots x_{179}[m]].$$

The CS can be thought of as a time domain guard interval between successive DMT symbols. If this guard interval is longer than the expected channel impulse response of the cable, then inter-DMT-symbol interference is prevented. This interference may be prevented because there will then be at least N samples of the received DMT symbol that do not contain any component of another delayed DMT symbol.

The cyclic extension provides another advantage because it allows for the simple removal of the intra-DMT-symbol interference. When the circularly extended DMT symbol is linearly convolved with the cable channel impulse response, the effect as seen by the receiver is as if the unextended DMT symbol were circularly convolved with the cable channel impulse response. Given a good estimate of that response based on QAM pilot subcarriers, ideally the intra-DMT-symbol interference can be completely removed with frequency domain adaptive equalization which is effectively a circular convolution operation. This holds as long as the channel impulse response is not longer than the CS.

With reference now to windowing module 724, the DMT signal has strong and slowly decreasing side lobes in the frequency domain caused by time domain waveform discontinuities at the DMT symbol boundaries. This can make it difficult to remove spectral images when the signal is interpolated to $2 \times F_{samp}$. Also, AFE filtering to prevent DMT interference into CVBS can be difficult. Windowing is very effective in smoothing the DMT time domain symbol transitions and thus reduces the out-of-band energy in exchange for losing the effectiveness of a small part of the CS. In addition to the CS, $N_W$ more cyclic samples for windowing are also appended to x[m] to form:

$$y[m]=[x_0[m]x_1[m] \ldots x_{N-1}[m]x_0[m]x_1[m] \ldots x_{N_{CS}+N_{W-1}}[m]]=[y_0[m]y_1[m] \ldots y_{N+N_{CS}+N_W-1}[m]].$$

As will be appreciated, raised-cosine windowing of the DMT symbol can substantially reduce the DMT signal sidelobes. Windowing is performed on y[m] in the following manner:

$$\tilde{y}_k[m]=y_k[n]w_k, k=0,1,\ldots,N+N_{CS}+N_W-1 \quad \text{(eqn. 1)}$$

where $w_k$ are samples of the raised cosine function given by $$w_k = \begin{cases} \frac{1}{2}\left[1-\cos\left(\frac{\pi k}{\beta N_s}\right)\right], & k=0,1,\ldots,N_W \\ 1, & k=N_W+1,\ldots,N_s-1 \\ \frac{1}{2}\left[1+\cos\left(\frac{\pi(k-N_s)}{\beta N_s}\right)\right], & k=N_s,\ldots,N_s+N_W \end{cases}$$

where $N_s=N+N_{CS}$ and $\beta=N_W/N_s$.

SLOC uses $N_W=21$ samples.

In DMT systems that use windowing, the final $N_W$ samples of each DMT symbol may be overlapped (summed) with the first $N_W$ samples of the next DMT symbol. This reduces the effective length of the CS by $N_W$ samples. However, in certain embodiments of the presently disclosed SLOC system, this approach is modified due to the half-duplex nature of the scheme. For the upstream DMT symbols, there is no overlap needed because those DMT symbols are always isolated; i.e. there is no adjacent DMT symbol being transmitted. As shown in constellation 1200 of FIG. 12, the downstream DMT symbols come in isolated pairs. Hence the final $N_W$ samples of the first symbol of the pair overlap the first $N_W$ samples of the second symbol of the pair. The overlapped pair of DMT symbols is given by:

$$\tilde{z}_k[m] = \begin{cases} \tilde{y}_k^{(0)}[m], & k=0,1,\ldots,N_s-1 \\ \tilde{y}_k^{(0)}[m]+\tilde{y}_{N_s-k}^{(1)}[m], & k=N_s,\ldots,N_s+N_W-1 \\ \tilde{y}_{k-N_s}^{(1)}[m], & k=N_s+N_W,\ldots,2N_s+N_W-1 \end{cases} \quad \text{(eqn. 2)}$$

where the superscripts (0) and (1) designate the first and second DMT symbols of the pair, respectively.

Figure 13:
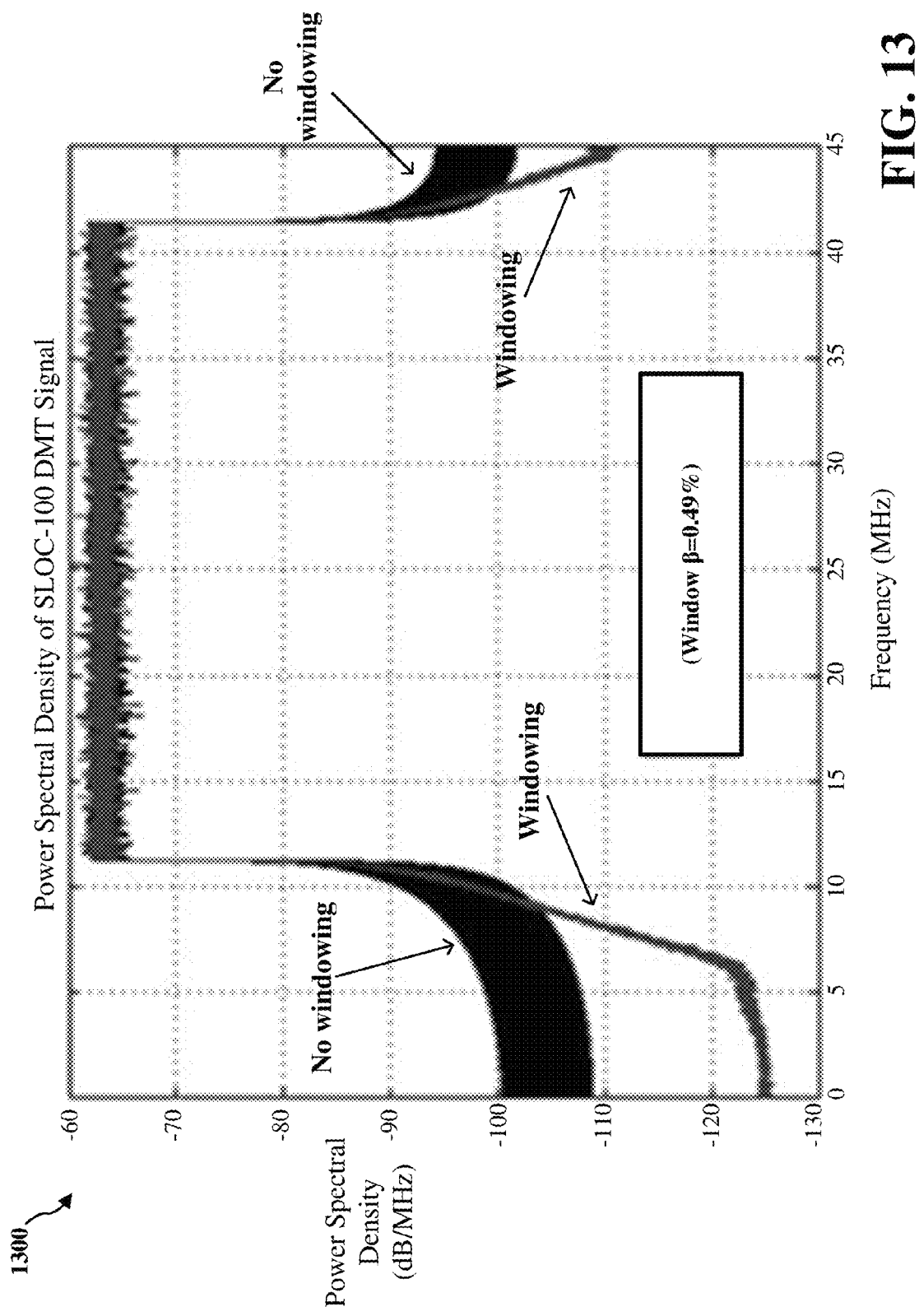
FIG. 13 is a chart illustrating side lobe energy reduction for the downstream signal according to certain aspects of the invention.

The side lobe energy reduction for the downstream signal is shown in the chart 1300 of FIG. 13. The 90 MHz sampled output of the windowing operation, $\tilde{y}_k[m]$ for upstream or $\tilde{z}_k[m]$ for downstream is fed to a 2× up-sampling half-band filter.

Figure 14:
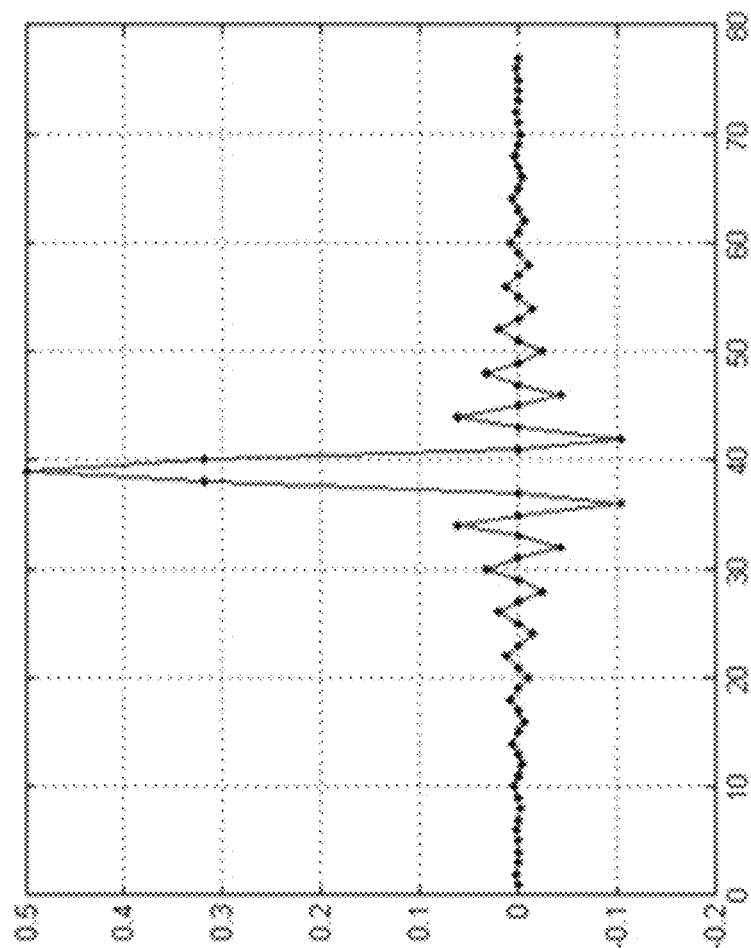
FIG. 14 illustrates discrete time-windowed half-band filter taps according to certain aspects of the invention.
Figure 15:
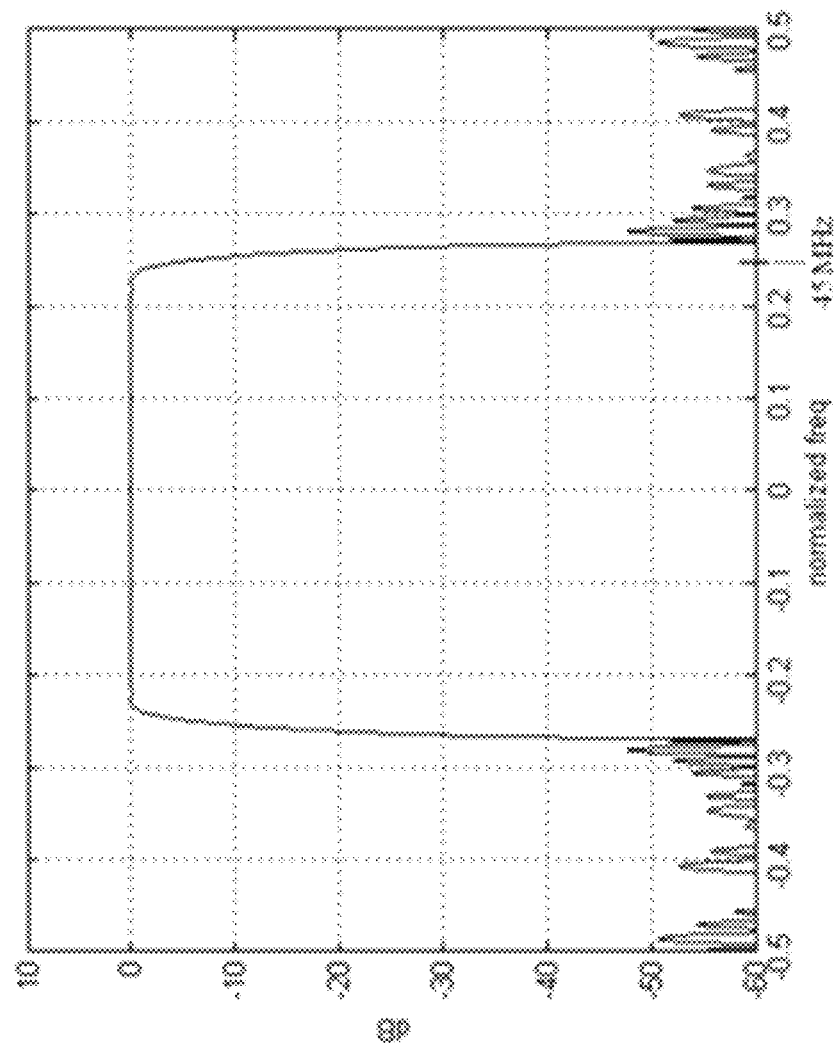
FIG. 15 illustrates a half-band filter response according to certain aspects of the invention.

Some embodiments employ a half-band up-sampling filter 726. After windowing, a next step may be to up-sample the signal of eqn. 1 or eqn. 2 by a factor of two. This may be achieved by inserting a zero sample between each data sample and then filtering the sequence with a half-band filter to remove the spectral images. An ideal infinitely long half-band filter has a brick wall frequency response. A practical implementation may truncate the discrete-time tap values using a window function which will cause some pass-band ripple and some slope in the pass-band to stop-band region. Tap values 1400 used in the SLOC transmitter half-band filter are shown in FIG. 14. Note that except for the center tap, every other tap value is zero. The resulting frequency response 1500 is shown in FIG. 15.

Figure 16:
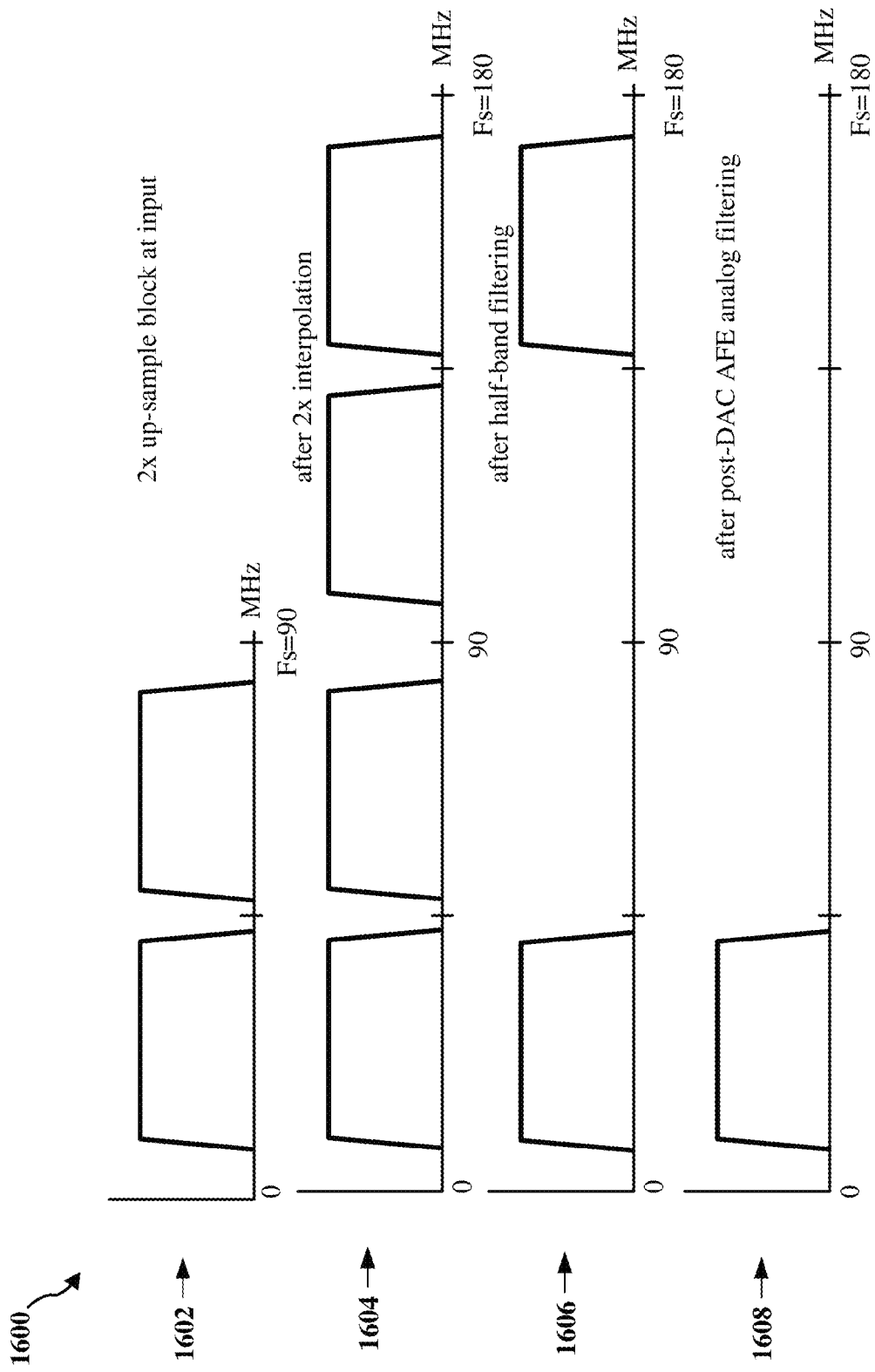
FIG. 16 illustrates DMT magnitude spectra related to sample rate conversion.

FIG. 16 is a drawing 1600 illustrating signal spectra 1602, 1604, 1606 and 1608. Spectrum 1602 illustrates the DMT signal spectrum at the input to the half-band filter with the sample rate $F_s=90$ MHz. The 2× up-sampled signal spectrum with resultant images is shown in the spectrum 1604. Application of this discrete-time half-band filter results in the spectrum 1606. Subsequent post-DAC AFE filtering removes the image near 180 MHz as seen in the spectrum 1608. If the length B half-band filter function is $h_i^{(HB)}$, then the filter output is $$b_n = \sum_{i=0}^{B-1} \tilde{z}_i h_{n-i}^{(HB)}.$$

In some embodiments, a clipping module 728 applies a clipping algorithm. For a DMT signal, the peak-to-average power ratio (PAPR) can be very high. The PAPR is defined as $$PAPR[m] \triangleq \frac{\max_{k,m}\{b_n b_n^*\}}{E[b_n b_n^*]}.$$

The PAPR is proportional to the number of subcarriers in a DMT symbol. A constant of proportionality differs based on the constellations modulating each subcarrier. The PAPR may be important because, if one wants to avoid signal clipping, substantial headroom is needed. However, this results in the need for a very large (in terms of number of bits) DAC/ADC to provide sufficient resolution (and thus low quantization noise).

Figure 17:
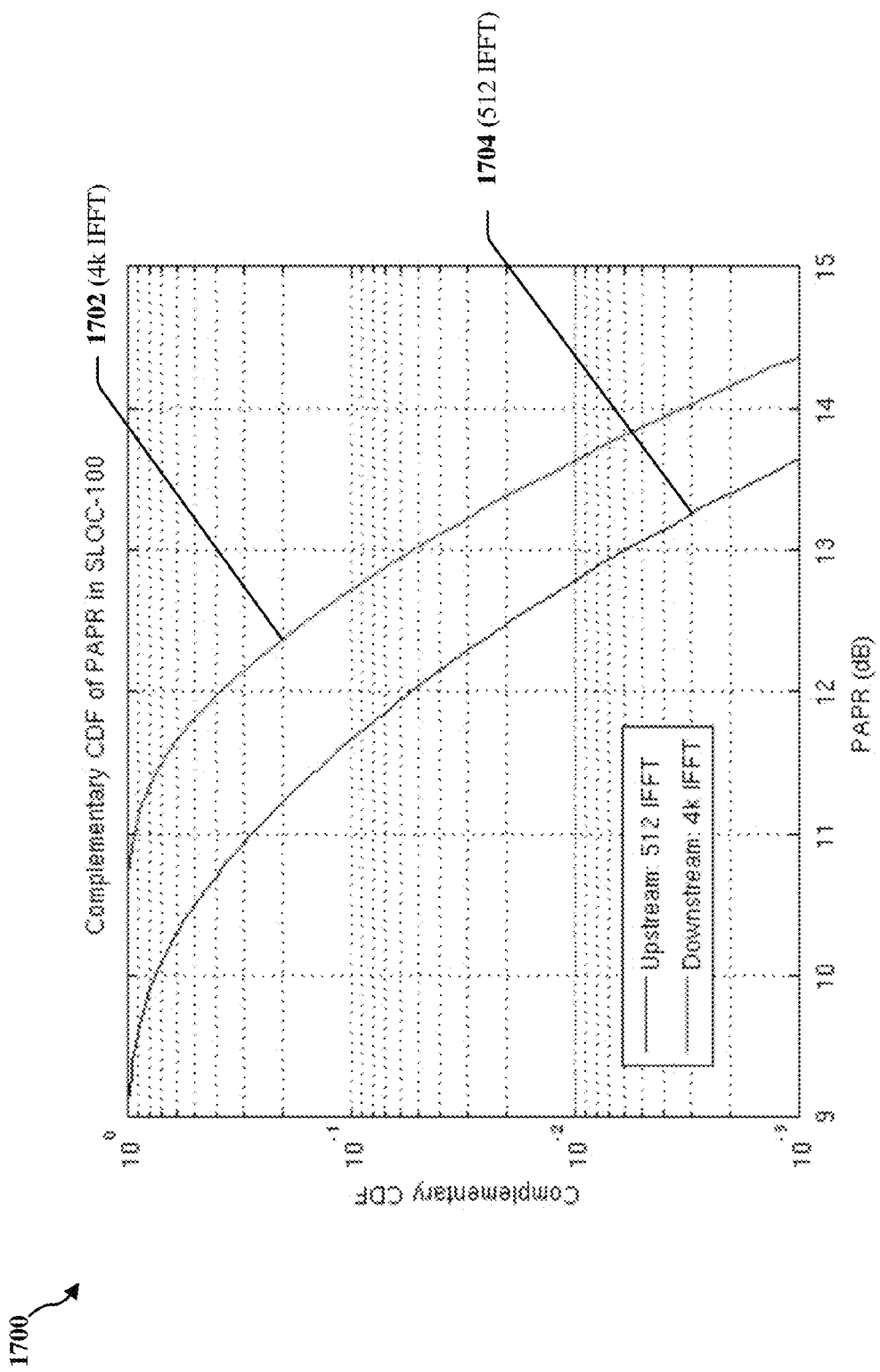
FIG. 17 illustrates probabilities of one or more clips within one DMT symbol.
Figure 18:
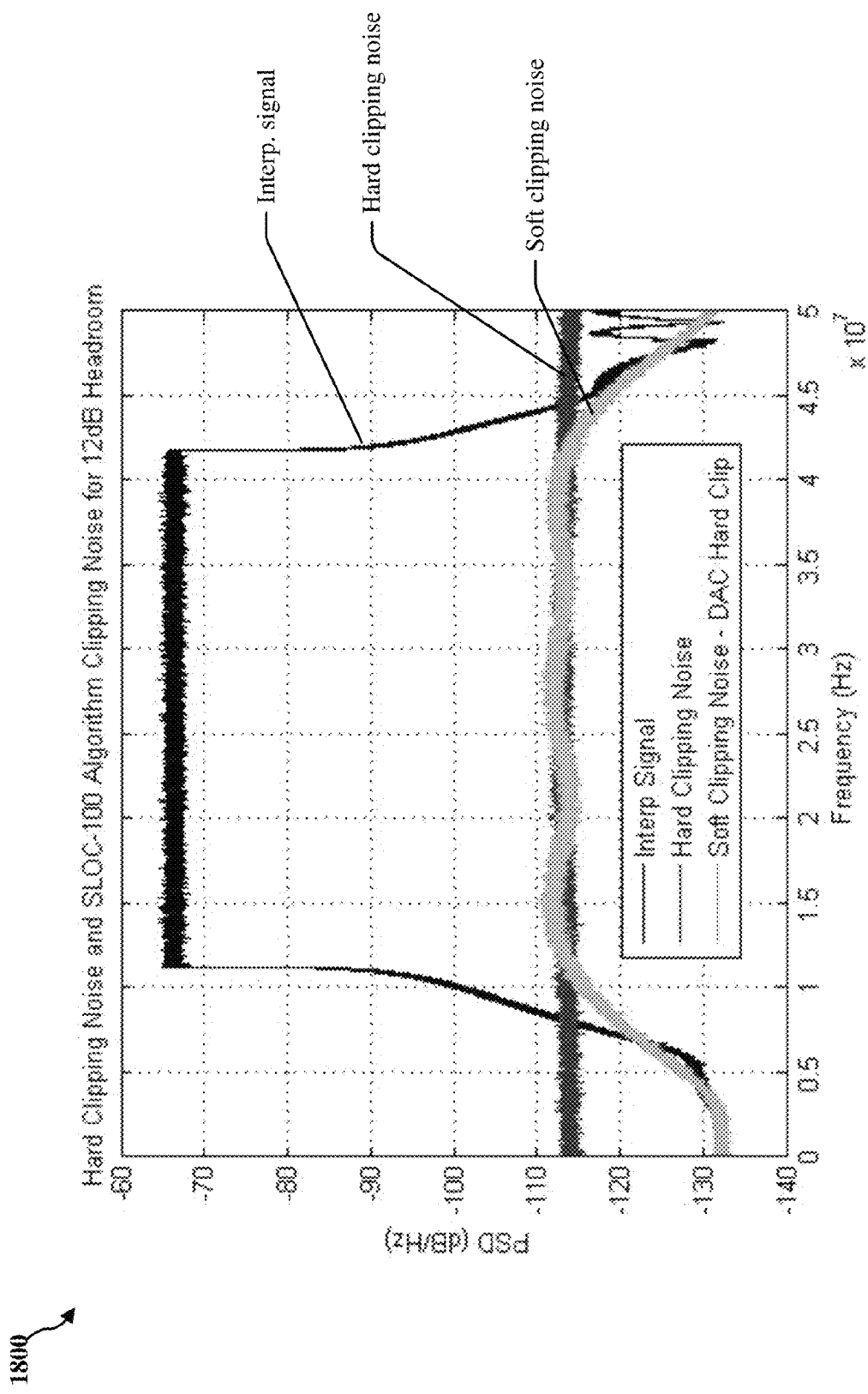
FIG. 18 is a plot illustrating spectral densities of DMT signal, hard clip noise, clip noise and significant out-of-band noise reduction according to certain aspects of the invention.

FIG. 17 includes a chart 1700 of the probability of the PAPR of a DMT symbol exceeding the x axis value for the case of a DMT signal modulated with random 64 QAM symbols. This is equivalent to the probability of one or more clips within a DMT symbol if the DAC headroom is set to the corresponding x axis value. Plots are given for the two IFFT lengths used in SLOC. The probability of a clip for a given headroom increases as the IFFT length increases. Such clipping of the half-band filter output generates both in-band and out-of-band (OOB) noise. Moreover, while more clips occur for larger IFFTs at a given headroom setting, the clip noise generated is averaged over more samples by the receiver FFT operation. This greatly diminishes the effect of clipping. A spectral plot of clipping noise 1702 with a headroom setting of 12 dB compared to the 4 k DMT signal 1704 is shown in the FIG. 18.

If clipping is executed at the fundamental DMT sample rate (90 MHz for SLOC), the noise generated is in-band. If the signal is clipped after 2× up-sampling, less in-band noise is generated, but significant OOB noise then appears. Low pass filtering can then reduce the OOB noise but also causes some regrowth in PAPR, partially undoing the benefit of clipping in the first place.

One effective method for hard clipping the up-sampled multicarrier signal and filtering out the OOB noise can be executed in an iterative manner. Since the filtering causes some PAPR regrowth, the method can be executed in an iterative manner. More iterations may achieve better control of the PAPR while at the same time creating more in-band noise. As illustrated by the schematic representation 1900 in FIG. 19, the up-sampled DMT signal 1910 may be hard clipped at 1902. Then a 2N-point FFT is performed at 1904. The high-order bins N to 2N-1 are set to zero to effect the OOB filtering at 1906. This is followed by a 2N-point IFFT 1908. The method performs well, but the additional 2N-point FFT/IFFT 1908 operation may incur unacceptably high hardware costs and/or processing burdens.

Figure 19:
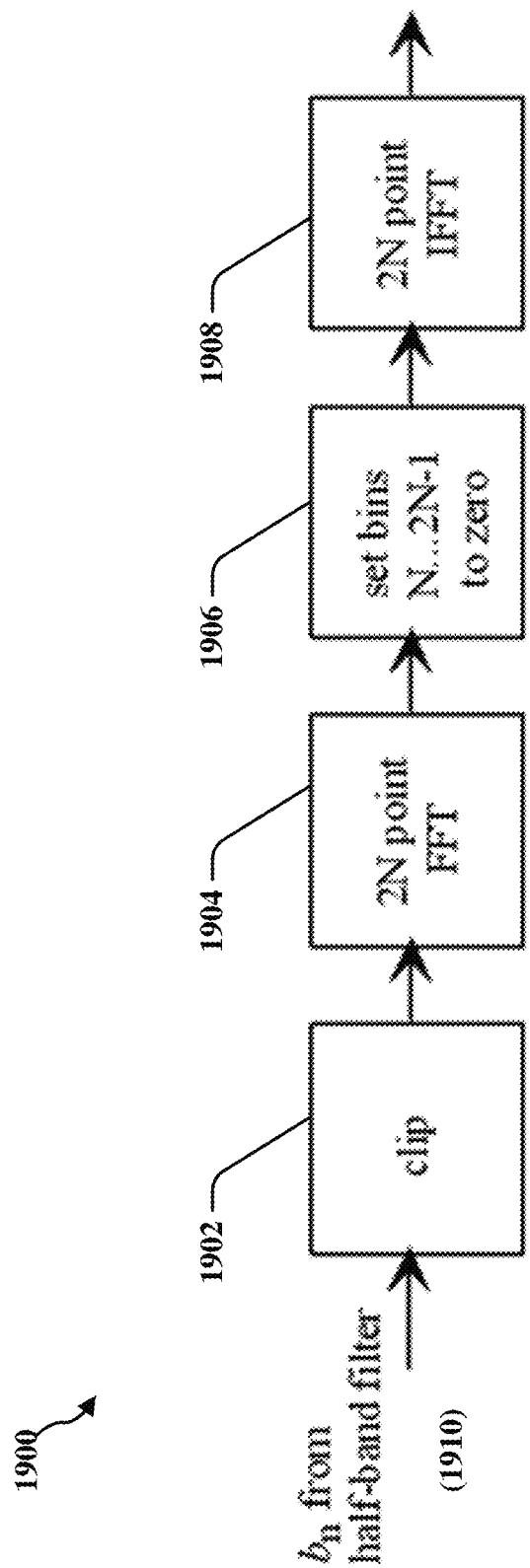
FIG. 19 is a schematic representation of a frequency domain filtering operation according to certain aspects of the invention.

Note that the frequency domain filtering operation 1900 in FIG. 19 is given by the point-wise multiplication with the brick wall function $$H_k^{(c)} = \begin{cases} 1 & k = 0, 1, \ldots, N-1 \\ 0 & k = N, \ldots, 2N-1 \end{cases}$$

This operation is equivalent to circular convolution with the sinc function $$h_n^{(c)} = F[H^{(c)}] \text{ where } F \text{ is the } DFT \text{ operator}$$

This inspires an essentially equivalent method that operates in the time domain utilizing circular convolution with $h_n^{(c)}$, eliminating the need for the additional FFT/IFFT. The significant reduction of OOB clip noise is shown in the comparison of the plots of FIG. 18. It will be appreciated that the clipping may be set to provide about 12 dB of headroom for the transmitted DMT signal. Module 730 performs interpolation to DAC rate. The half-band output may be sent to a Farrow interpolator, which increases the sampling rate from $2F_s$ to $2F_c = 2F_s \times 64/63$.

Data Framing

Figure 20:
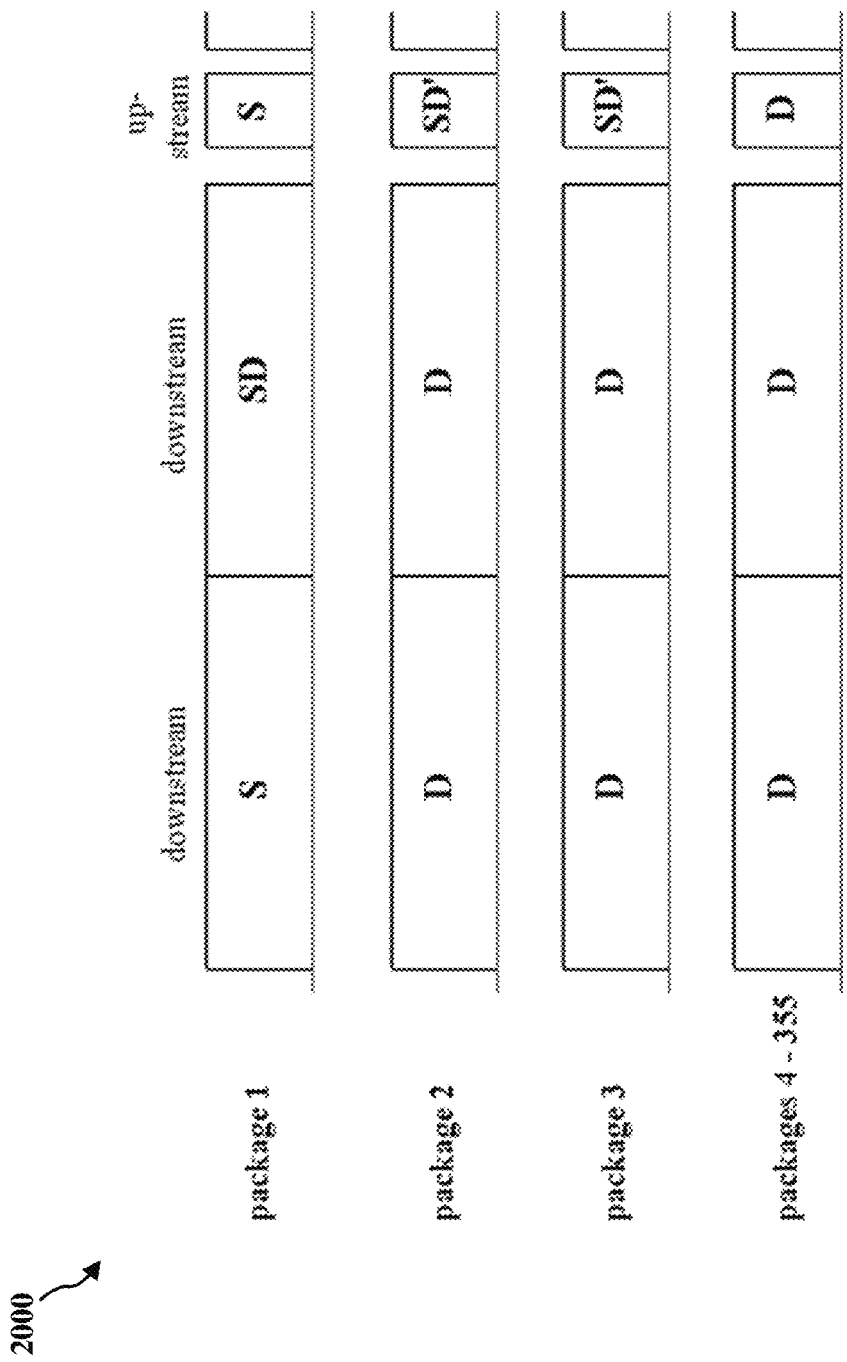
FIG. 20 is a schematic illustrating half-duplex alternating downstream and upstream DMT symbols according to certain aspects of the invention.

Data framing affects the operation of both SLOC transmitter and SLOC receiver. A superframe and an interleave-frame are defined herein. A superframe structure may be distinct from the interleave-frame that is used for upstream signals. A downstream superframe comprises a superframe DMT sync symbol, a DMT system data (sysdata) symbol with no pilot subcarriers, and 708 DMT data symbols, each with a pair of rotating pilot subcarriers. An upstream superframe comprises a superframe DMT sync symbol, 2 DMT sysdata symbols each with a rotating pilot subcarrier, and 352 DMT data symbols, each with a rotating pilot subcarrier. The superframe can be viewed as containing 355 packages. Due to the half-duplex alternating format of two downstream DMT symbols then one upstream DMT symbol per package, the upstream and downstream super-frames may coincide. This is illustrated in the timing diagrams 2000 of FIG. 20.

A DMT superframe sync symbol (downstream and upstream) may comprise a specific uncoded PN sequence in the form of BPSK symbols modulating the data subcarriers. The four sync subcarriers are also present. This sequence can be robustly detected by the receiver using means known in the art. In one example, the start of a superframe is used to:

Synchronize the transmitter randomizer and the receiver derandomizer. At the start of the super-frame the registers are set to the value F180H for downstream, 3180H for upstream.

Synchronize the transmitter moving pilot pattern with the expected pilot locations at the receiver digital equalizer. All downstream pilot subcarriers are covered after exactly 354 downstream DMT data symbols. All upstream pilot subcarriers are covered after exactly 2 upstream sysdata symbols and 175 upstream DMT data symbols. Thus there are two full rotations or circulations per superframe.

Indicate to the receiver the location of the DMT sysdata symbols.

As noted, certain embodiments employ a rotating pilot pattern. For each downstream DMT symbol, a different pair of BPSK modulated pilot subcarriers may be assigned within the useful subcarrier range of 510-1923. These subcarriers pairs may be assigned in a rotating manner. In one example, only even-numbered subcarriers are assigned except for subcarrier 1923. All pilot subcarriers can be covered after 354 DMT symbols (i.e., one super-frame). For example a process for pilot subcarrier assignment may operate as follows:

$f_l=510$, $f_u=1923$;
at superframe sync:
  initialize k=0;
at start of each DMT symbol:
  N=0;
  while N<2
    BR_count=bit-reversed value of k;
    if {($f_l \leq$ BR_count $\leq f_u$) && (BR_count is even)} or (BR_count=1923)
    then
      BR_count is a pilot subcarrier for this DMT symbol;
      N=N+1;
    k=k+1;

A similar process may be adopted for the upstream DMT signal, although a few differences may be evident. One difference relates to the "while loop" condition, which may be changed to N<1 so that only one pilot subcarrier is assigned per DMT symbol. The bounds ($f_l$=63, $f_u$=239) may be different and both even and odd subcarriers may be assigned as pilots. Thus:

$f_l$=63, $f_u$=239;
at superframe sync:
 initialize k=0;
at start of each DMT symbol:
 N=0;
 while N<1
  BR_count=bit-reversed value of k;
  if {($f_l$≤BR_count≤$f_u$)}
   then
    BR_count is a pilot subcarrier for this DMT symbol;
    N=N+1;
  k=k+1;

Upstream DMT sysdata symbols may structured as follows:
 8 bytes of sysdata are carried per superframe
 DMT sysdata symbol #1
  4 bytes-16 uncoded 4-QAM symbols in 4 subbands
  Data repeated 11 times over all 44 subbands
 DMT sysdata symbol #2
  4 bytes-16 uncoded 4-QAM symbols in 4 subbands
  Data repeated 11 times over all 44 subbands Downstream DMT sysdata symbols are structured as follows:
 8 bytes of sysdata are carried per superframe
 DMT sysdata symbol
  8 bytes-32 uncoded 4-QAM symbols in 1 subband
  Data repeated 44 times over all 44 subbands The 8 bytes of data contain the following elements:
 subband number (1-44)
 constellation assigned to that subband (indicated by numbers 0-7 respectively representing null, 4-QAM, 8-PSK, 16-QAM, 32-QAM, 64-QAM, 128-QAM, 256-QAM and 512-QAM).
 transmitted power level associated with that subband
 P parameter—number of bytes per RS packet
 Interleaver B parameter
  5-36 indicated by numbers 0-31 for upstream,
  same as P for downstream
 For upstream only, interleave-frame DMT symbol count (xmitter_W_count)

It will be appreciated that the subband number, constellation assignment, subband power level, and B and P parameters are transmitted for use by the opposite side transmitter. The element xmitter_W_count is transmitted for use by the opposite side receiver.

Based on a current channel estimate, the upstream receiver may read the sysdata from the 4 subbands having the highest SNR for each of the respective four parts of the sysdata. These subbands need not be adjacent. For the downstream signal, the downstream receiver may read the sysdata from one subband having the highest SNR.

Further robustness for the received sysdata can be achieved by using a confidence counter (conf_ctr) algorithm, which may be implemented as a conf_ctr element in any combination of hardware and software for each element of the sysdata information. This is illustrated in the flowchart 2100 of FIG. 21 which may apply to all sysdata elements except the upstream xmitter_W_count. In the downstream and upstream receivers there may be 46 separate conf_ctr elements. These cover the constellation assignments and power levels for the 44 subbands and the B and P parameters. In one example, values for flow chart parameters are max=16 and thresh=6.

In the upstream receiver there may be an additional conf_ctr element for xmitter_W_count, as discussed elsewhere herein.

The upstream interleave-frame may be defined to include W DMT data symbols, where W is determined by means described elsewhere herein. The interleave-frame start is not usually aligned to the superframe start. Included in the upstream DMT sysdata symbol subsequent to each DMT superframe sync symbol is an element containing the current transmitter interleave-frame DMT data symbol count value (xmitter_W_count). This is a modulo W counter. Note that for the downstream signal, W is typically effectively set to 1.

Unlike the other sysdata elements, xmitter_W_count is not just received and saved. The receiver has its own interleave frame symbol counter, rcvr_W_count, that may be incremented modulo W as each DMT data symbol is received. An algorithm, such as the algorithm illustrated in the flowchart 2200 of FIG. 22 enables synchronization of the transmitter and receiver counters. This results in robust interleave-frame synchronization so that the upstream deinterleaver correctly deinterleaves the received bytes. The significance of the W parameter is explained elsewhere herein.

Data Mapping to DMT Data Symbols

There can be exactly 1408 data subcarriers per downstream DMT symbol, and 1408/8=176 data subcarriers per upstream DMT symbol and subcarriers may be modulated with QAM symbols. The number of net data bits carried by each data subcarrier depends on the constellation assigned to the QAM symbols for that subcarrier (see Table 2).

TABLE 2

| Constellation ($2^m$) | m bits per QAM-symbol | m − 1 (net) bits per QAM-symbol |
|---|---|---|
| 8 PSK | 3 | 2 |
| 16 QAM | 4 | 3 |
| 32 QAM | 5 | 4 |
| 64 QAM | 6 | 5 |
| 128 QAM | 7 | 6 |
| 256 QAM | 8 | 7 |
| 512 QAM | 9 | 8 |

As a result of this bit-loading, the net number of transmitted data bits per DMT symbol (and thus the net bit rate) can vary with the selected constellation-to-subband mappings. Regardless of the selected bit-loading assignments, it may be desirable to have a consistent alignment between RS packet start points and DMT symbol boundaries. This can be accomplished by having an exact integral number of RS packets per V DMT symbols, where V is a small integer.

In some embodiments, (i) The number of RS packets per DMT symbol is U/V where either U is an integer and V=1, or U=1 and V is an integer, regardless of the bit-loading assignments. It may also be desirable to have consistent alignment between the top most commutator switch point in the interleaver-deinterleaver and the DMT symbol boundaries. This can be achieved by aligning the top switch position to every Wth DMT symbol boundary, where W denotes a given number of DMT symbols comprising an interleave-frame. In some embodiments, (ii) the number of bytes in W DMT symbols is exactly an integer multiple B, regardless of the bit-loading assignments. Embodiments (i) provide for simple synchronization of the RS decoder in the receiver. The DMT receiver early processing will robustly establish the location of DMT symbol boundaries by any appropriate means known in the art. The location of DMT symbol boundaries, together with knowledge of V and P, can be used by RS decoder to denote the RS packet starting points. Embodiments (ii) provide for simple synchronization of the receiver deinterleaver to the transmitter interleaver. Knowledge of the DMT symbol boundary plus the DMT data symbol count within the length W "interleave-frame" can be used by the receiver to synchronize the deinterleaver commutator switch position to match that of the transmitter interleaver. This count is maintained in the receiver and synchronized to the corresponding count in the transmitter.

Corollaries to item (i) can be stated as follows: (1) the number of bytes per V DMT symbols must be an integer, and (2) the number of RS packets per V DMT symbols must be an integer. The requirement stated in the corollary 1 can be achieved by constraining the number of subcarriers per assignable subband to be an integer multiple of 4. This assures that each subband contains an integer number of half-bytes regardless of constellation assignment. See Table 3. In Table 3 it is indicated that an upstream (US) DMT symbol comprises 44 subbands of 1×4=4 subcarriers each (44×4=176 data subcarriers), and a downstream (DS) DMT symbol consists of 44 subbands of 8×4=32 subcarriers each (44×32=1408 data subcarriers).

TABLE 3

| Con-stella-tion ($2^m$) | m bits per QAM-symbol | m−1 (net) bits per QAM-symbol | 4 subcarriers 1 subband (US) | | 32 subcarriers 1 subband (DS) | |
|---|---|---|---|---|---|---|
| | | | net bits | net bytes | net bits | net bytes |
| 8 PSK | 3 | 2 | 8 | 1 | 64 | 8 |
| 16 QAM | 4 | 3 | 12 | 1.5 | 96 | 12 |
| 32 QAM | 5 | 4 | 16 | 2 | 128 | 16 |
| 64 QAM | 6 | 5 | 20 | 2.5 | 160 | 20 |
| 128 QAM | 7 | 6 | 24 | 3 | 192 | 24 |
| 256 QAM | 8 | 7 | 28 | 3.5 | 224 | 28 |
| 512 QAM | 9 | 8 | 32 | 4 | 256 | 32 |

For the upstream signal, it can be seen that because some subbands may carry an integer plus one-half bytes, two DMT symbols are needed guarantee an integer number of bytes. For the downstream signal, a single DMT symbol will always carry an integer number of bytes.

To meet the requirement of corollary 2, P may be allowed to vary with the bit-loading (the number of parity bytes may be kept constant with only the number of data bytes varying). For the upstream signal, V=2, U=1; U/V=½ RS packets per DMT symbol, 2 DMT symbols carry exactly 1 RS packet. For the downstream signal, V=1, U=4; U/V=4 RS packets per DMT symbol.

Item (ii) provides for the simple synchronization of the interleaver and deinterleaver. For the downstream signal this is easily achieved as follows:

B parameter ($B_{DS}$) set equal to P
$M_{DS}=1$
$W_{DS}=1$
Thus the number of bytes per W=1 DMT symbol is exactly $4B_{DS}$.

As for the downstream signal, it may be desired that the number of bytes in W DMT symbols be an integer multiple $B_{US}$. Achieving this for the upstream signal is somewhat more complicated and is explained as follows:

$B_{US}=\text{ceil}(B_{DS}/6), M_{US}=6$
Since an upstream DMT symbol may include a half-byte, set $W_{US}=\text{even integer}\times B_{US}$ For SLOC upstream, Wus=2×$B_{US}$. This defines the length of an upstream interleave-frame. The upstream interleave-frame boundaries are determined at the upstream receiver. In the following two examples, it is assumed that the channel response measured by the respective upstream and downstream receivers is virtually the same. In that case the bit-loading assignments will be spectrally identical and $P_{US}=P_{DS}$.

However, that need not be the case. In the first example, the upstream and downstream constellation to subcarrier assignments are given in Table 4 (upstream constellation mappings for 100.8 Mbps downstream operation over 2000 feet of RG-59) and Table 5 (downstream constellation mappings for 100.8 Mbps downstream operation over 2000 feet of RG-59), respectively and illustrated in FIG. 3.

TABLE 4

| US Constellation | # subbands | # subcarriers | bytes per DMT sym | net bit-rate Mbps |
|---|---|---|---|---|
| 8 PSK | 7 | 28 | 7 | 0.43 |
| 16 QAM | 9 | 36 | 13.5 | 0.83 |
| 32 QAM | 6 | 24 | 12 | 0.74 |
| 64 QAM | 6 | 24 | 15 | 0.92 |
| 128 QAM | 6 | 24 | 18 | 1.10 |
| 256 QAM | 6 | 24 | 21 | 1.29 |
| 512 QAM | 4 | 16 | 16 | 0.98 |
| totals | 44 | 176 | 102.5 | 6.29 |

TABLE 5

| DS Constellation | # subbands | # subcarriers | bytes per DMT sym | net bit-rate Mbps |
|---|---|---|---|---|
| 8 PSK | 7 | 28 × 8 = 224 | 7 × 8 = 56 | 6.88 |
| 16 QAM | 9 | 36 × 8 = 288 | 13.5 × 8 = 108 | 13.28 |
| 32 QAM | 6 | 24 × 8 = 192 | 12 × 8 = 96 | 11.80 |
| 64 QAM | 6 | 24 × 8 = 192 | 15 × 8 = 120 | 14.75 |
| 128 QAM | 6 | 24 × 8 = 192 | 18 × 8 = 144 | 17.70 |
| 256 QAM | 6 | 24 × 8 = 192 | 21 × 8 = 168 | 20.65 |
| 512 QAM | 4 | 16 × 8 = 128 | 16 × 8 = 128 | 15.74 |
| totals | 44 | 1408 | 102.5 × 8 = 820 | 100.80 |

This bit-loading is provided to enable the 100 Mbps downstream bit rate to be achieved, given the cable frequency response of FIG. 1. Other bit rate targets combined with different cable types and/or lengths may use different constellation-to-subcarrier mappings. In this example, each upstream DMT symbol carries 102.5 bytes. Two DMT symbols carry 205 bytes which is P. For the downstream signal, each DMT symbol carries 820 bytes. P is 820/4=205 bytes (same for upstream and downstream). For the interleaver-deinterleaver we have $P_{DS}=205; P_{US}=205$
$B_{DS}=P_{DS}; B_{US}=\text{ceil}(P_{US}/6)=\text{ceil}(34.167)=35$
$W_{US}=2\times 35=70$ DMT data symbols per interleave-frame
number of bytes in 70 upstream DMT data symbols is 70×102.5=7175
Requirement is that 7175 is an integer multiple of 35: 7175/35=205

Figure 23:
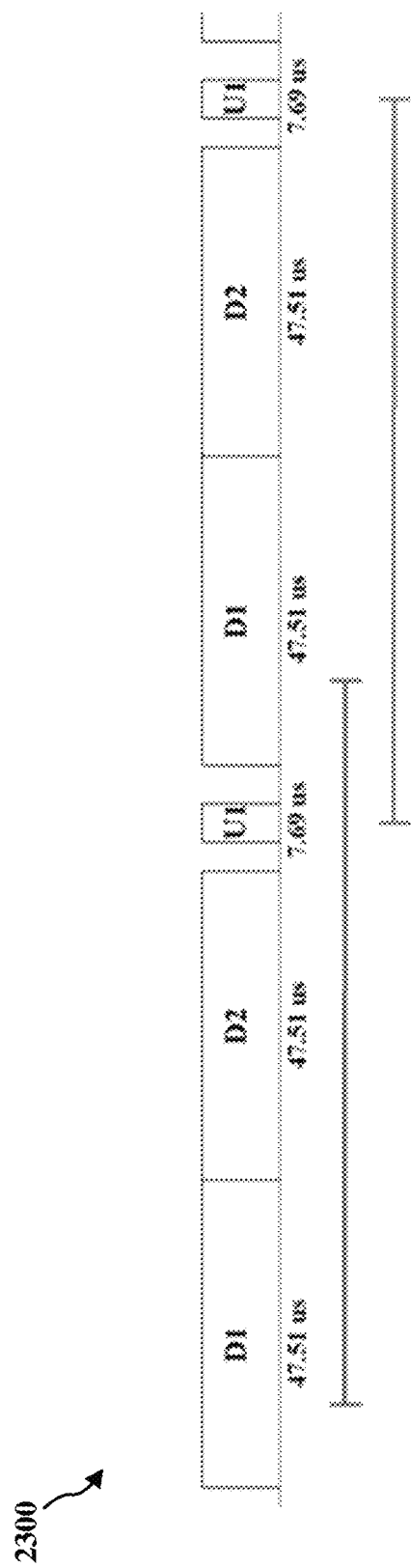
FIG. 23 illustrates an impulse duration tolerance goal according to certain aspects of the invention.

The impulse duration tolerance goal is one package as illustrated in FIG. 23. The respective upstream and downstream impulse duration tolerance is:

$B_{US}\times t=35\times 12$ bytes=2.049 RS packets >1 package.
$B_{DS}\times t=205\times 12$ bytes=12 RS packets >1 package.

Figure 24:
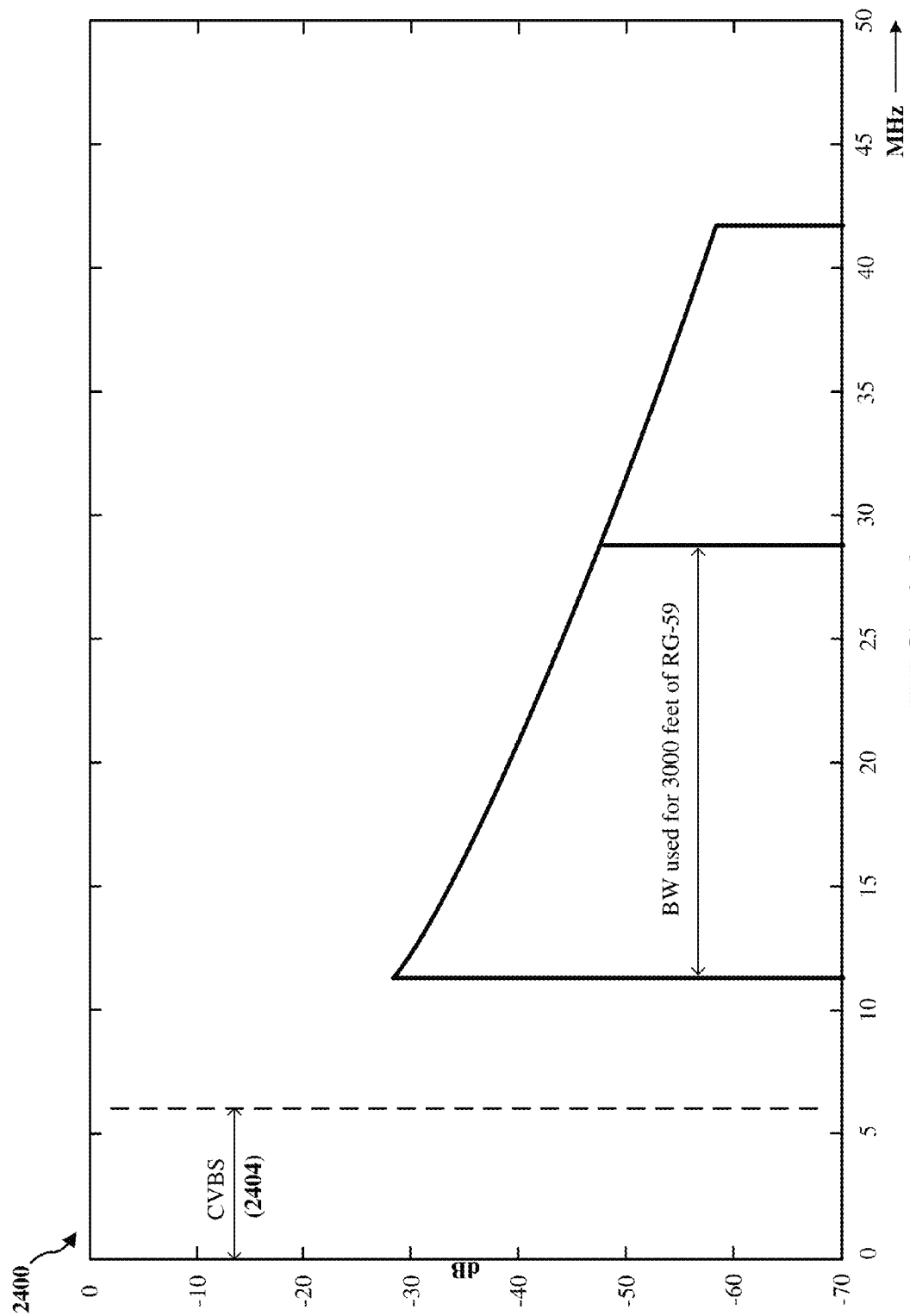
FIG. 24 is a chart illustrating frequency response for 3000 feet of RG-59.
Figure 25:
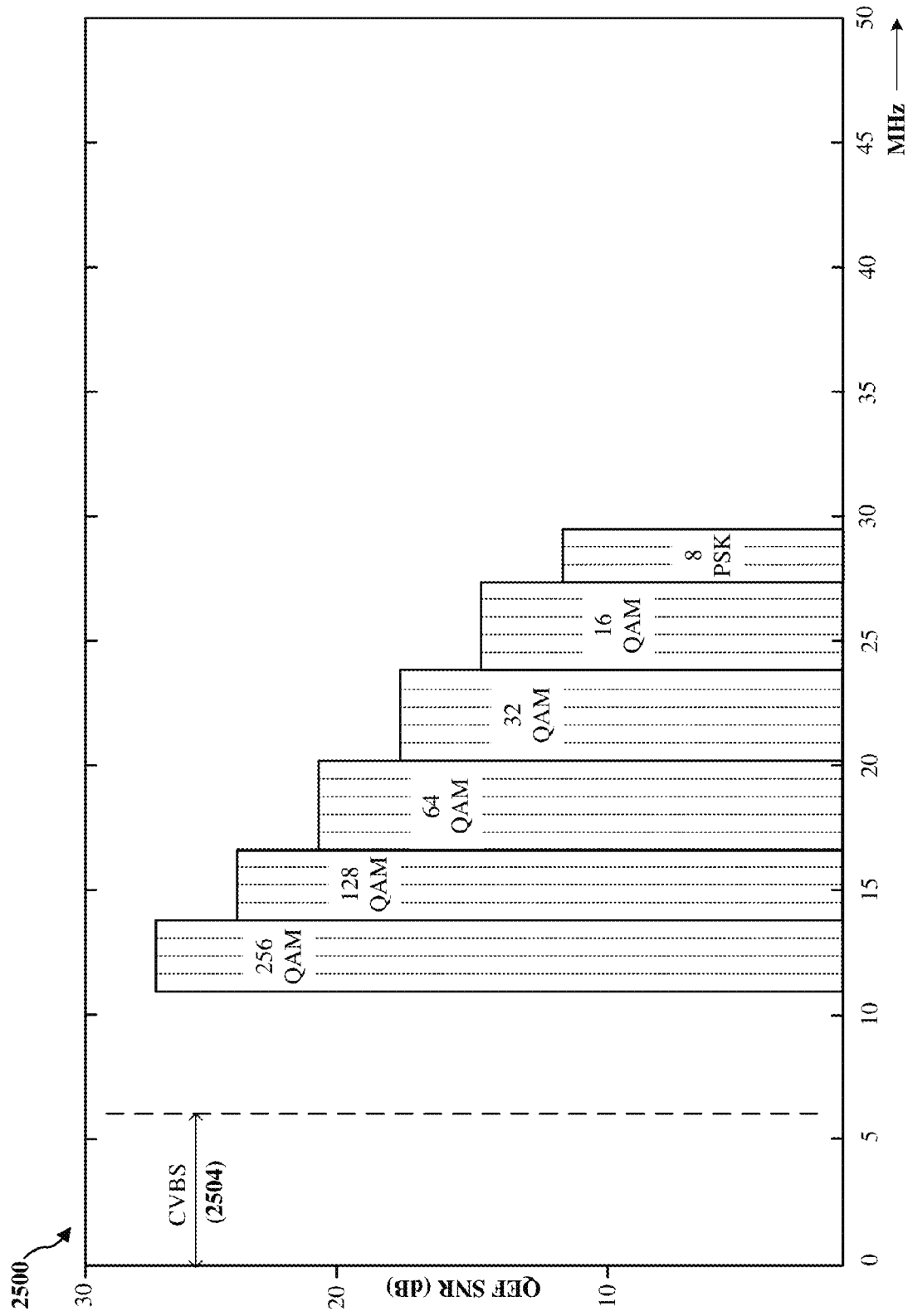
FIG. 25 is a frequency distribution chart illustrating an example of constellation to subband assignment according to certain aspects of the invention.

The second example addresses the case of 3000 feet of RG-59 cable. The frequency response for 3000 feet of RG-59 is shown in FIG. 24. Approximately 30 dB of tilt is observed across the SLOC signaling band. The upstream and downstream constellation to subcarrier assignments are given in Table 6 (upstream constellation mappings for 52.29 Mbps downstream operation over 3000 feet of RG-59) and Table 7 (downstream constellation mappings for 52.29 Mbps downstream operation over 3000 feet of RG-59), respectively and illustrated in FIG. 25.

TABLE 6

| US Constellation | # subbands | # subcarriers | bytes per DMT sym | net bit-rate Mbps |
|---|---|---|---|---|
| 8 PSK | 3 | 12 | 3 | 0.17 |
| 16 QAM | 5 | 20 | 7.5 | 0.41 |
| 32 QAM | 5 | 20 | 10 | 0.55 |
| 64 QAM | 5 | 20 | 12.5 | 0.69 |
| 128 QAM | 4 | 16 | 12 | 0.66 |
| 256 QAM | 4 | 16 | 14 | 0.77 |
| 512 QAM | 0 | 0 | 0 | 0.00 |
| totals | 26 (of 44) | 104 (of 176) | 59 | 3.26 |

TABLE 7

| DS Constellation | # subbands | # subcarriers | bytes per DMT sym | net bit-rate Mbps |
|---|---|---|---|---|
| 8 PSK | 3 | 12 × 8 = 96 | 3 × 8 = 24 | 2.66 |
| 16 QAM | 5 | 20 × 8 = 160 | 7.5 × 8 = 60s | 6.65 |
| 32 QAM | 5 | 20 × 8 = 160 | 10 × 8 = 80 | 8.86 |
| 64 QAM | 5 | 20 × 8 = 160 | 12.5 × 8 = 100 | 11.08 |
| 128 QAM | 4 | 16 × 8 = 128 | 12 × 8 = 96 | 10.63 |
| 256 QAM | 4 | 16 × 8 = 128 | 14 × 8 = 112 | 12.41 |
| 512 QAM | 0 | 0 × 8 = 0 | 0 × 8 = 0 | 0.00 |
| totals | 26 (of 44) | 823 (of 1408) | 59 × 8 = 472 | 52.28 |

This second example illustrates operation over a 3000 foot cable where the receiver SNRs for the higher frequency subbands would be too low for reliable reception due to the increased high-frequency attenuation of the longer cable. The higher frequency subbands are therefore not used. This reduces the net bit rate but allows for reliable reception of data at the lower rate. Note that due to the nulling of the higher order data subcarriers, we can transmit the active subcarriers with more power per subcarrier. Each upstream DMT symbol carries 59 bytes. Two DMT symbols carry 118 bytes which is P. For the downstream signal, each DMT symbol carries 472 bytes. P=472/4=118 bytes (same for upstream and downstream). For the interleaver-deinterleaver we have:

$P_{DS}$=118; $P_{US}$=118

$B_{DS}$=$P_{DS}$; $B_{US}$=ceil($P_{US}$/6)=ceil(19.67)=20

$W_{US}$=2×20=40 DMT data symbols per interleave-frame number of bytes in 40 upstream DMT data symbols is 40×59=2360

Requirement is that 2360 is an integer multiple of 20: 2360/20=118

The impulse duration tolerance goal is one package as illustrated in FIG. 23. The respective upstream and downstream impulse duration tolerance is $B_{US}$×t=20×12 bytes=2.034 RS packets >1 package $B_{DS}$×t=205×12 bytes=12 RS packets >1 package Table 8 shows the range of values of P that result from the bit-loading calculations over a wide range of cable lengths. Also shown are the $B_{DS}$, $B_{US}$, $W_{US}$ and impulse tolerance in RS packets for each P.

TABLE 8

| | Downstream, M = 1 | | Upstream, M = 6 | | |
|---|---|---|---|---|---|
| $P_{DS}$, $P_{US}$ | $B_{DS}$ = $P_{DS}$ | max impulse $B_{DS}$t/P packets | $B_{US}$ = ceil($P_{US}$/6) | max impulse $B_{US}$t/P packets | $W_{US}$ = 2 × $B_{US}$ |
| 211-216 | 211-216 | 12 | 36 | 2.05-2.00 | 72 |
| 205-210 | 205-210 | 12 | 35 | 2.05-2.00 | 70 |
| 199-204 | 199-204 | 12 | 34 | 2.05-2.00 | 68 |
| 193-198 | 193-198 | 12 | 33 | 2.05-2.00 | 66 |
| 187-192 | 187-192 | 12 | 32 | 2.05-2.00 | 64 |
| 181-186 | 181-186 | 12 | 31 | 2.06-2.00 | 62 |
| 175-180 | 175-180 | 12 | 30 | 2.06-2.00 | 60 |
| 169-174 | 169-174 | 12 | 29 | 2.06-2.00 | 58 |
| 163-168 | 163-168 | 12 | 28 | 2.06-2.00 | 56 |
| 157-162 | 157-162 | 12 | 27 | 2.06-2.00 | 54 |
| 151-156 | 151-156 | 12 | 26 | 2.07-2.00 | 52 |
| 145-150 | 145-150 | 12 | 25 | 2.07-2.00 | 50 |
| 139-144 | 139-144 | 12 | 24 | 2.07-2.00 | 48 |
| 133-138 | 133-138 | 12 | 23 | 2.08-2.00 | 46 |
| 127-132 | 127-132 | 12 | 22 | 2.08-2.00 | 44 |
| 121-126 | 121-126 | 12 | 21 | 2.08-2.00 | 42 |
| 115-120 | 115-120 | 12 | 20 | 2.09-2.00 | 40 |
| 109-114 | 109-114 | 12 | 19 | 2.09-2.00 | 38 |
| 103-108 | 103-108 | 12 | 18 | 2.10-2.00 | 36 |
| 97-102 | 97-102 | 12 | 17 | 2.10-2.00 | 34 |
| 91-96 | 91-96 | 12 | 16 | 2.11-2.00 | 32 |
| 85-90 | 85-90 | 12 | 15 | 2.12-2.00 | 30 |
| 79-84 | 79-84 | 12 | 14 | 2.13-2.00 | 28 |
| 73-78 | 73-78 | 12 | 13 | 2.14-2.00 | 26 |
| 67-72 | 67-72 | 12 | 12 | 2.15-2.00 | 24 |
| 61-66 | 61-66 | 12 | 11 | 2.16-2.00 | 22 |
| 55-60 | 55-60 | 12 | 10 | 2.18-2.00 | 20 |
| 49-54 | 49-54 | 12 | 9 | 2.20-2.00 | 18 |
| 43-48 | 43-48 | 12 | 8 | 2.23-2.00 | 16 |
| 37-42 | 37-42 | 12 | 7 | 2.27-2.00 | 14 |
| 31-36 | 31-36 | 12 | 6 | 2.32-2.00 | 12 |
| 26-30 | 26-30 | 12 | 5 | 2.30-2.00 | 10 |

Start-Up

System start-up begins with the repeated transmission of two PN sequences (tr0 and tr1) in the form of BPSK symbols modulating the data subcarriers. For downstream, the sequences are based on a length-2047 binary PN sequence shortened to length-1414. For upstream, the sequences are based on a length-255 sequence shortened to length-177. These sequences assist the receiver in achieving sample synchronization and DMT symbol synchronization. Also, the receiver may use the training data to calculate an accurate channel estimate and SNR per subband estimate. The channel estimate may in turn be used to determine the initial frequency domain equalizer tap weights using methods known in the arts.

Channel and SNR estimates may then be fed by the receiver to a bit-loading (BL) algorithm that calculates for the opposite side transmitter the desired:

constellation to subband assignments subband transmit power levels number of bytes per DMT data symbols, and the number of bytes per RS packet (P)

$B_{US}$ and $W_{US}$ for upstream, $B_{DS}$=P, W=1 for downstream

As previously explained, the elements associated with the latter two bullet points are functions of the first bullet point. This sysdata is periodically sent to the other side in DMT sysdata symbols for use by the other side transmitter.

Each respective receiver may synchronize to the DMT superframe sync symbols which may enable it to find the DMT sysdata symbols. The sysdata is reliably read from these symbols as described previously. When the conf_ctr elements reach threshold, the sysdata is used for the transmitter:

constellation to subband assignments
subband transmit power levels
P, B, and W

Channel conditions may change slowly over time. The receiver continuously updates the channel state and SNR per subband estimates. This may result in altered bit-loading parameters. Thus, the sysdata may change and can be sent to the respective transmitter via the periodic DMT sysdata symbols. According to another aspect of the invention, system startup relates to the half-duplex TDMA synchronization between the two sides. Both sides transmit according to predetermined protocol to avoid collision. This is managed on each side by using the sample clock as a global clock to drive a counter that indicates to each respective side when to transmit its part of the package.

Framing Control Operation

With reference again to FIG. 7, a controller-pilot pattern generator (CPPG) module 718 accepts as input two sets of sysdata from the local receiver. Input sysdata X 734 is received by the local receiver from the opposite side. Input sysdata X 734 can be used by the transmitter to create the framing for the signal it is to transmit. Input sysdata Y 736 may be calculated by the local receiver and transmitted to the opposite side in DMT sysdata symbols.

During start up, the CPPG 718, using the QAM symbol type input selector 738 provided to the QAM symbol mux 716, selects the special input. The CPPG 718 generates BPSK symbols for the PN sequence for tr0 for the first type of DMT training symbol, followed by BPSK symbols for the PN sequence tr1 for the second type of DMT training symbol. This is repeated for a sufficient period of type to allow the receiver on the opposite side to achieve sample clock sync, DMT symbol sync, and equalization.

After start up, the CPPG 718 generates a superframe DMT sync symbol coincident with every $710^{th}$ DMT symbol for the downstream transmitter, and every $355^{th}$ DMT symbol for the upstream transmitter. At that time BPSK symbols are output for the superframe DMT sync symbol comprising a PN sequence and QPSK symbols for the current W_count (W_count to be used by opposite side receiver for interleave-frame sync). This is fed to the QAM symbol mux 714 at the special input. This is followed by one DMT sysdata symbol with no pilot subcarriers (downstream), or two DMT sysdata symbols each with a single pilot subcarrier (upstream), also fed to the QAM symbol mux at the special input. This sysdata will be used by the opposite side transmitter. The superframe sync signal 740 may also be used to initialize the randomizer 708.

The remainder of the DMT symbols of the superframe are DMT data symbols, which may comprise subcarriers modulated by either QAM data symbols from the mapper 714, null QAM symbols, rotating pilot or sync BPSK symbols. The respective inputs are selected by the CPPG 718 using signal 738 based on the IFFT subcarrier to which the particular QAM/BPSK symbol is to be assigned. For the QAM data symbol coding, using signal 740 the CPPG 718 indicates to the PTCM coder 712 and mapper 714 the code rate and constellation to be used for the next QAM data symbol. This is based on knowledge of the BL map from sysdata X 734.

As noted herein, subcarriers carrying pilots may be selected according to one or more algorithms. For the upstream signal, subcarriers 63-239 may comprise 176 data carrying subcarriers and 1 pilot subcarrier with a subcarrier index that changes for each DMT data symbol. For a given DMT data symbol, if the pilot is assigned to subcarrier x, the index for all the data subcarriers at index x and above are increased by one so as to "make room" for the pilot subcarriers. For the downstream signal, subcarriers 519-1923 comprise 4 sync subcarriers at fixed indexes, 1408 data subcarriers and 2 pilot subcarriers whose index changes for each DMT data symbol. As with the upstream signal, the data subcarriers have to "make room" for the pilot subcarriers. For a given DMT data symbol, it may be assumed that the pilots are assigned to index x and y, with x<y. The index for all data subcarriers at index x and above but below index y are incremented by 1. The index for all data subcarriers at index y and above are incremented by 2.

The CPPG 718 feeds the RS coder 704 the RS packet size P based on sysdata X 734. It also sends the RS coder 704 a sync signal coincident with every Vth DMT data symbol (V=1 for downstream, V=2 for upstream. For the V=2 case, the count is synchronized to the superframe).

The CPPG 718 feeds the interleaver 706 the B parameter form sysdata X 734 and a sync symbol coincident with every Wth DMT data symbol. The modulo W count at every superframe DMT symbol time is loaded onto that superframe DMT sync symbol as previously described.

Figure 26:
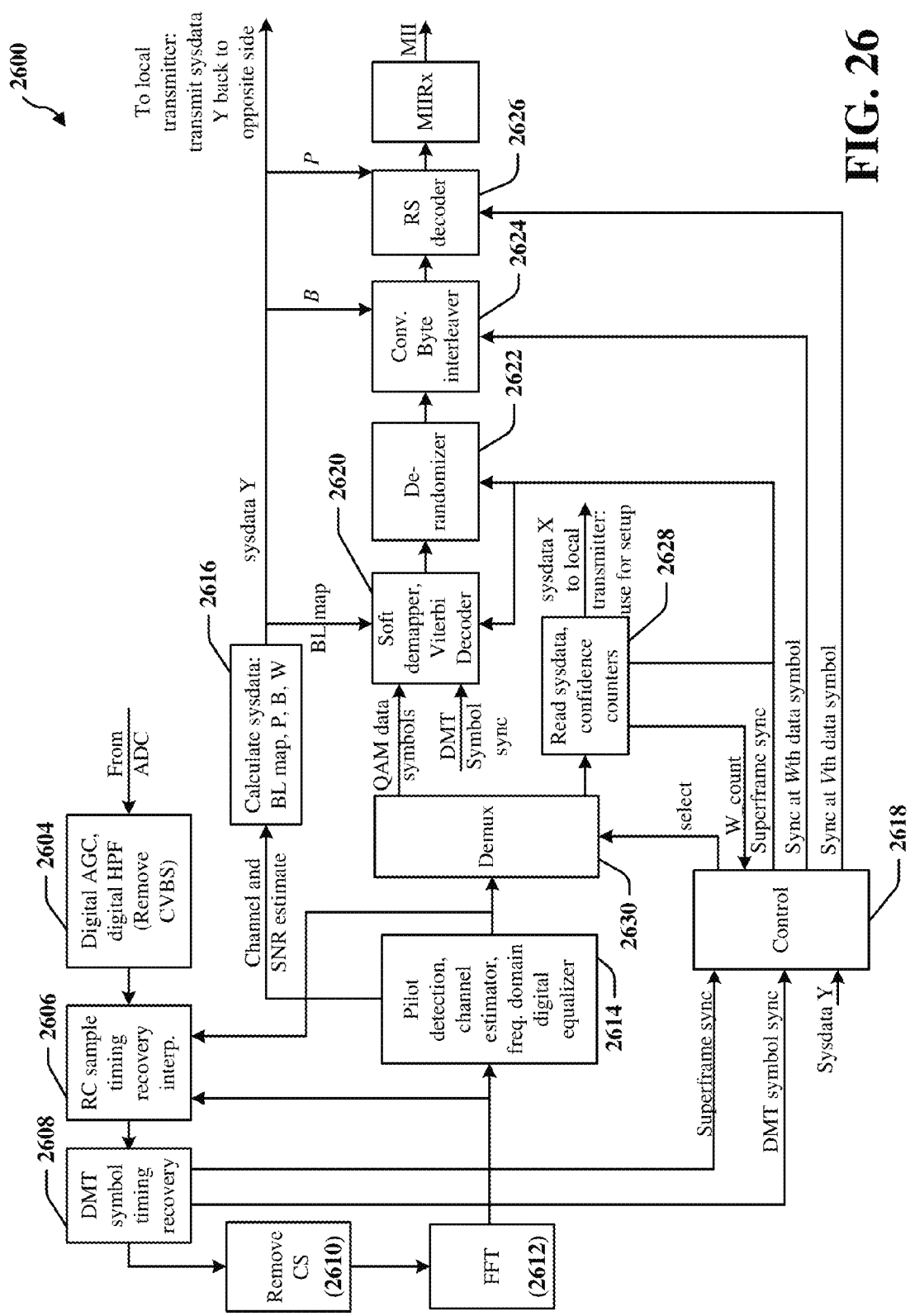
FIG. 26 is a schematic illustrating a DMT receiver according to certain aspects of the invention.

With reference now to FIG. 26, at a receiver 2600, the BL map is calculated in module 2616 based on the channel and SNR estimates from the digital frequency domain equalizer module 2614. The P, B, and W parameters may be calculated based on the BL map as previously described. This is termed sysdata Y and is a function of the channel conditions seen by this receiver. The sysdata Y 736 BL map in combination with superframe sync and DMT symbol sync may be used by the soft demapper/Viterbi decoder module 2620 to know the constellation and code rate for current input the QAM symbol. The W and P parameters are fed respectively to the deinterleaver 2624 and RS decoders 2626.

The control module 2618 is fed by superframe sync and DMT symbol sync. From this information it is known whether the QAM symbols at the demultiplexer (demux) input are DMT data symbols or DMT sysdata symbols. This information is used to control the demux 2630 so as direct the QAM symbols to either the soft demapper/Viterbi decoder 2620 or the read sysdata module 2628.

Figure 21:
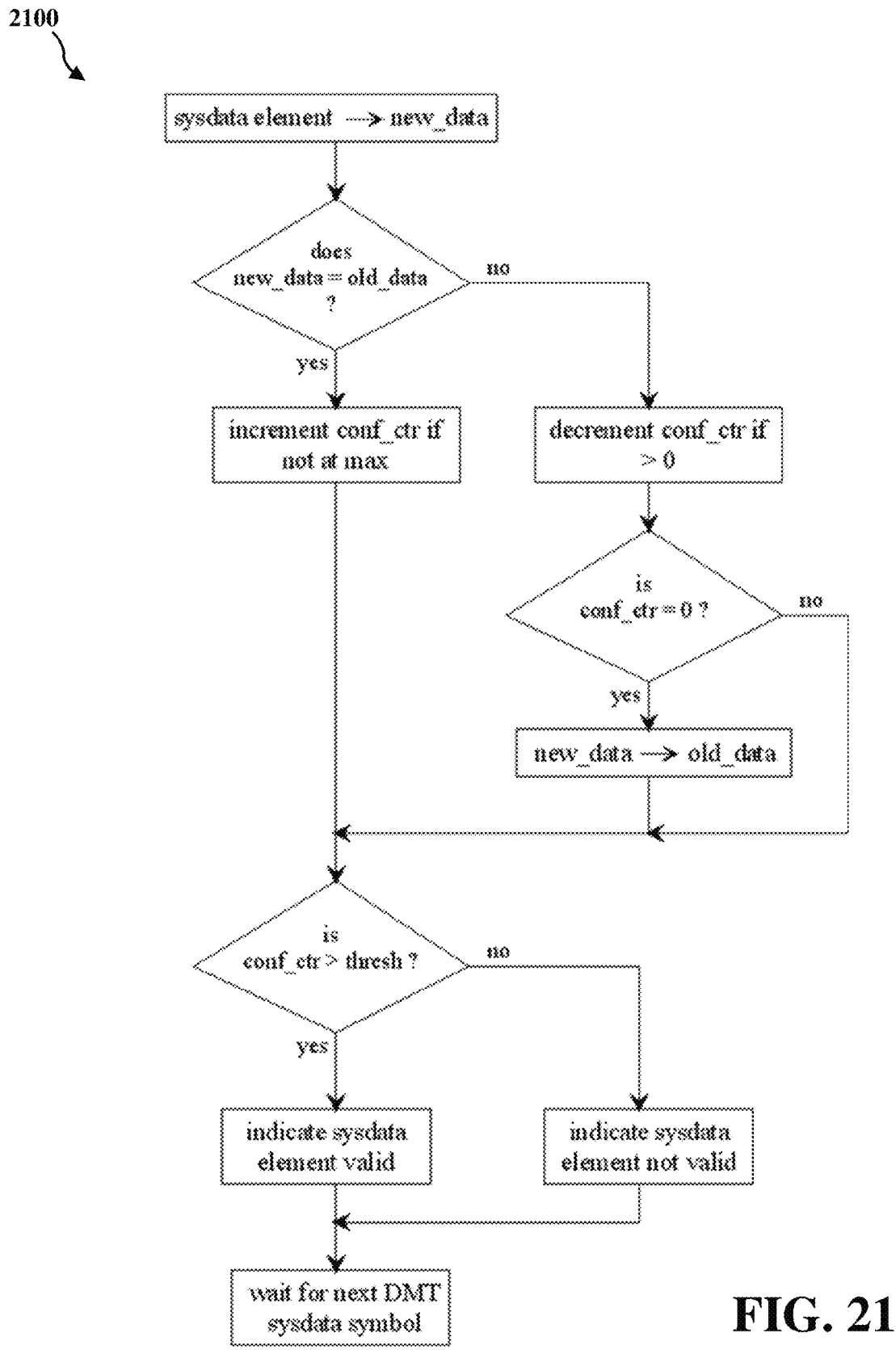
FIG. 21 is a flowchart of a method for determining confidence according to certain aspects of the invention.
Figure 22:
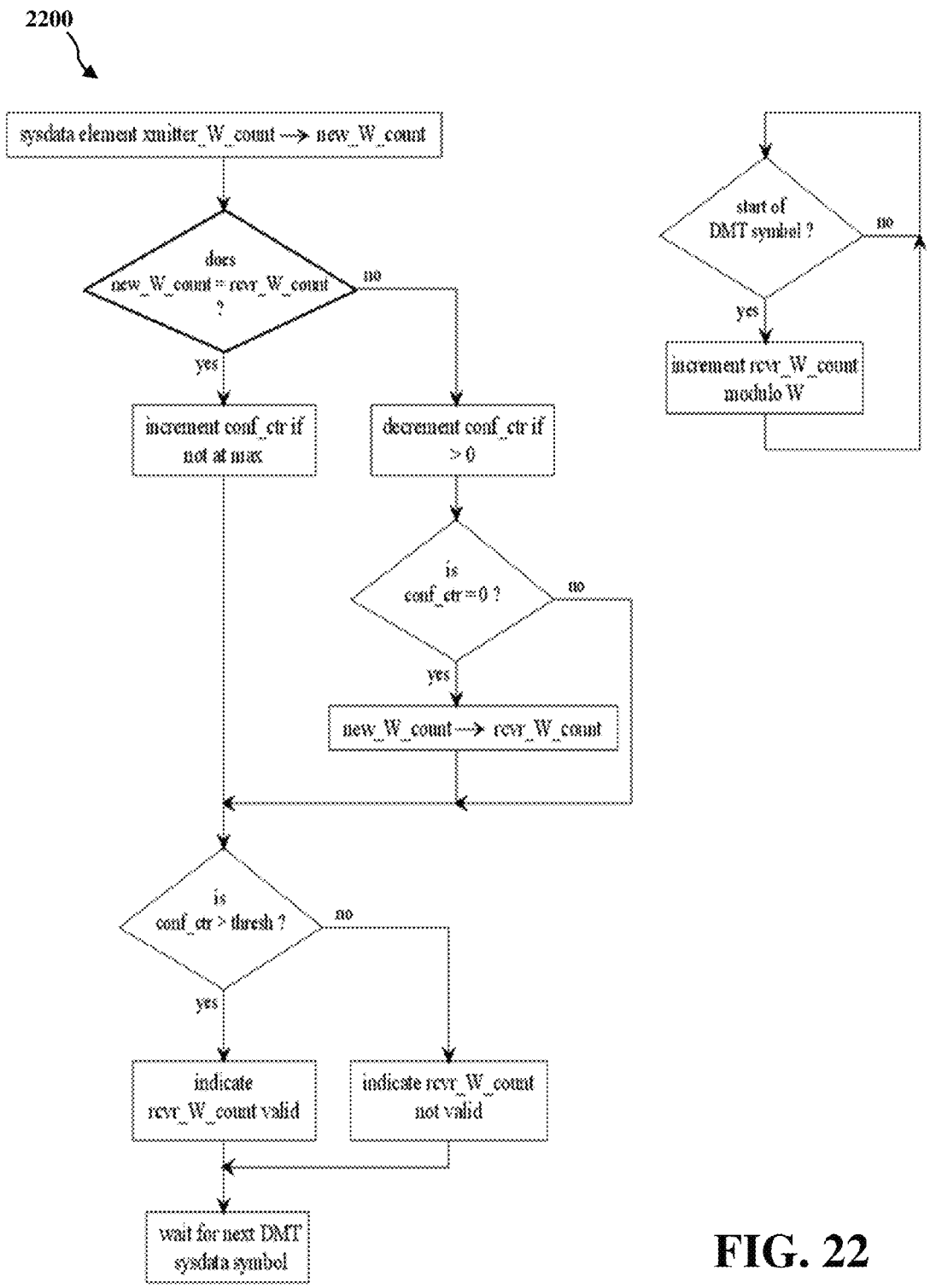
FIG. 22 is a flowchart of a method for synchronizing transmitter and receiver counters according to certain aspects of the invention.

The read sysdata module extracts sysdata X and executes the confidence counter algorithm of FIG. 21. This is fed to the local transmitter. For the W_count, the algorithm of FIG. 22 is executed and this value is fed back to the control module which uses it to update a modulo W DMT data symbol counter used to generate the sync at Wth DMT data symbol signal.

Based on the sysdata Y input and the input sync signals, the control module outputs a sync signal every Wth DMT symbol to synchronize the deinterleaver operation. It also outputs a sync signal every Vth DMT symbol to synchronize the RS decoder operation.

SLOG DMT Receiver

With continued reference to the DMT receiver of FIG. 26, an ADC running at nominally 90 MHz provides input to a digital AGC and HPF module 2604. The AGC provides 12-13 dB of headroom while the HPF suppresses the remaining CVBS signal after the analog BPF in the receiver AFE. Sample clock frequency and phase recovery as well as DMT symbol timing recovery are briefly described here.

The DMT system may be very sensitive to sample clock frequency and phase error. Since the DMT transmitter and receiver each have their own local oscillators, frequency error may initially exist. At the camera side, the DMT transmitter and DMT receiver use the same sample clock. If the DVR side receiver can synchronize to the camera side transmitter sample clock, and then use that clock for its transmitter, all four sample clocks will be synchronized.

Figure 27:
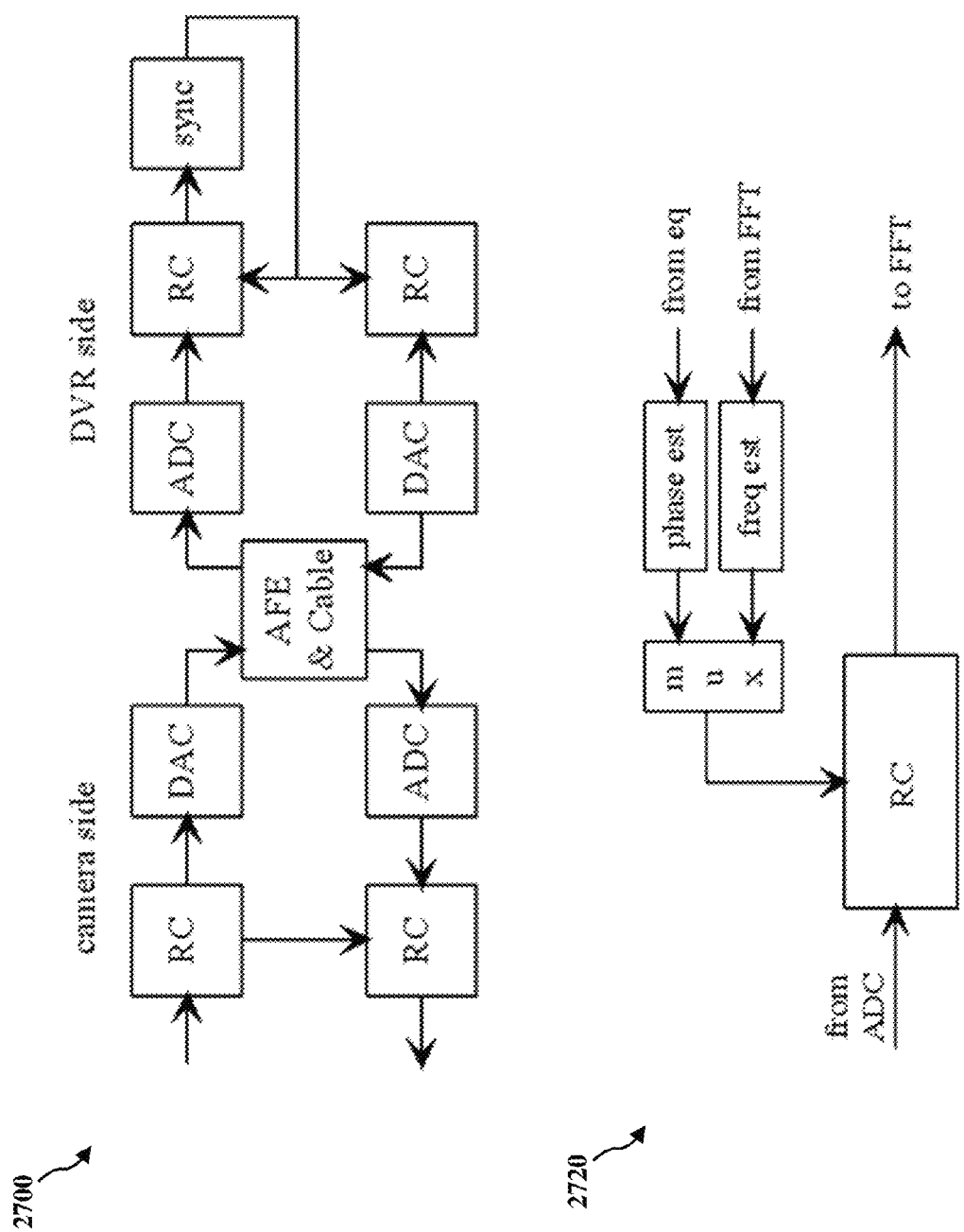
FIG. 27 illustrates sample clock synchronization and side receiver rate conversion according to certain aspects of the invention.

A high-level view 2700 of the sample clock scheme and/or generator is shown in FIG. 27. The RC blocks are sample rate converters that utilize Farrow architectures to achieve sample rate conversion. As can be seen, only the DVR side receiver need utilize a synchronization loop.

The rate converter control loop 2720 for the DVR side DMT receiver is shown in FIG. 27. The sample clock frequency and phase error are estimated using frequency domain data. The error estimates are used by the rate convertor to adjust the interpolation timing using well known methods. Frequency synchronization is achieved during system start-up with the aid of DMT training symbols during start-up. The phase is tracked during normal data transmission with the aid of the four pilot subcarriers.

Also during system start-up, at the receiver the boundaries of the transmitted DMT symbols must be found. This is typically needed to synchronize the FFT starting point so as to prevent inter-symbol-interference. In the receiver a time domain cross-correlation operation using the a priori known transmitted PN sequence finds the peaks from which the DMT symbol boundaries are inferred.

The receiver may employ Fast Fourier Transforms (FFTs). Let r[m] be the mth N-length vector of DMT signal samples at the input to the N-point FFT module of FIG. 31. That vector is given by:

$$r[m] = \left[ r_{-\frac{N}{2}}[m] \, r_{-\frac{N}{2}+1}[m] \, \ldots \, \ldots \, r_{\frac{N}{2}-1}[m] \right].$$

Then the FFT efficiently computes the vector $$\acute{A}[m] = \left[ \acute{A}_{-\frac{N}{2}}[m] \acute{A}_{-\frac{N}{2}+1}[m] \, \ldots \, \ldots \, \acute{A}_{\frac{N}{2}-1}[m] \right]$$

where $$\acute{A}_k[m] = \frac{1}{\sqrt{N}} \sum_{n=-N/2}^{N/2-1} r_n[m] e^{\frac{-j2\pi kn}{N}},$$

$$k = \frac{-N}{2}, \frac{-N}{2}+1, \ldots, \frac{N}{2}-1.$$

In order to compute the FFT, the DMT receiver employs a pipelined architecture composed of $\log_2 N$ stages of "butterfly boxes", each including a complex multiplier. (The transmitter IFFT architecture is similar.) Memory requirements are on the order of N to 2N and vary somewhat with the particular architecture chosen. For the downstream receiver, the 4096-point decimation in frequency (DIF) FFT module comprises six radix-4 stages. For the upstream receiver, the 512-point DIF FFT module comprises one radix-2 stage followed by four radix-4 stages. The DIF FFT input is in normal subcarrier order. The output is in bit-reversed subcarrier order.

Channel Estimation and Equalization

After AGC and synchronization have been achieved, the pilot subcarriers provide the channel estimator with the information it needs to calculate an estimate of the cable frequency response. During training, all the useful subcarriers can be considered to be pilots. After training, the pilot subcarriers rotate or circulate as previously explained. The instantaneous channel estimate at DMT symbol time m is:

$$\hat{H}[m] = [\hat{H}_{f_l}[m] \hat{H}_{f_l+D}[m] \ldots \hat{H}_{f_l+M \, D} \hat{H}_{f_u}[m]]$$

where $f_l \ldots f_u$ is the span of useful subcarriers (63-239 upstream, 510-1923 downstream). For the downstream signal, M=706 and D=2. For the upstream signal, M=175 and D=1. After training, at each DMT symbol time m, only p elements of the vector are updated; the rest retain their values computed during previous DMT symbols. For downstream, p=2. For upstream, p=1. Thus each element of the complex vector H is determined by the magnitude and phase of the received BPSK symbol when the corresponding subcarrier is assigned to be a pilot. Each element (frequency bin) of the vector is given by:

$$\hat{H}_i[q_i] = \frac{Z_i[q_i]}{P_i[q_i]},$$

$$i = f_l, f_{l+D}, \ldots f_{l+MD}, f_u$$

where $Z_i$ is the received sample, $P_i$ is the a priori known BPSK pilot symbol, and i is a pilot subcarrier number during DMT symbol time $q_i$.

The rotating pilots allow for the tracking of slow changes to the channel frequency response. The frequency bins are updated over time by:

$$\tilde{H}_i[q_i] = (1-\beta)\tilde{H}_i[q_i] + \beta\hat{H}_i[q_i - j]$$

where $\beta$ is a forgetting factor and j is 177 for upstream and 354 for downstream, i.e. the time relative to $q_i$ when the pilot for subcarrier i was last received.

Due to the smaller IFFT for the upstream signal, its frequency bins are relatively wide. For that reason a pilot subcarrier is sent on a rotating basis for all the subcarriers from $f_l \ldots f_u$ so that no interpolation is needed to determine any of the subcarrier channel estimates. For the downstream signal, with D=2, "in between" subcarrier channel estimates are computed using cubic interpolation. The full interpolated channel estimate at time s, $\acute{H}_n[s]$, is given by For $n \in \{f_l, f_{l+D}, \ldots, f_{L+MD}, f_u\}$, $\acute{H}_n[s] = \tilde{H}_n[q_n]$ For $n \in \{513, 515, \ldots, 1919\}$, $$\acute{H}_n[s] =$$

$$\frac{-1}{16}\tilde{H}_{n-3}[q_{n-3}] + \frac{9}{16}\tilde{H}_{n-1}[q_{n-1}] + \frac{9}{16}\tilde{H}_{n+1}[q_{n+1}] + \frac{-1}{16}\tilde{H}_{n+3}[q_{n+3}]$$

For $n = 511$, $$\acute{H}_{511}[s] =$$

$$\frac{5}{16}\tilde{H}_{510}[q_{510}] + \frac{15}{16}\tilde{H}_{512}[q_{512}] + \frac{-5}{16}\tilde{H}_{514}[q_{514}] + \frac{1}{16}\tilde{H}_{516}[q_{516}]$$

For $n = 1921$, $$\acute{H}_{1921}[s] =$$

$$\frac{1}{16}\tilde{H}_{1916}[q_{1916}] + \frac{-5}{16}\tilde{H}_{1918}[q_{1918}] + \frac{15}{16}\tilde{H}_{1920}[q_{1920}] + \frac{5}{16}\tilde{H}_{1922}[q_{1922}].$$

Each received sample of DMT symbol s at the equalizer input (FFT output) is given by $$\acute{A}_n[s] = H_n[s]A_n[s] + V_n[s] \text{ where } V_n[s] \text{ is noise.}$$

Assuming that the width of each subcarrier bin is small enough so that the channel response is approximately flat across each bin, zero-forcing equalization can be achieved by simply inverting the channel response based on the channel estimate. For DMT symbol s, the QAM symbol transmitted on subcarrier n where $n \in \{f_l \ldots f_u\}$, is estimated by the equalizer as:

$$\hat{A}_n[s] = \acute{A}_n[s] \cdot \frac{1}{\acute{H}_n[s]}$$

where $\acute{H}_n[r]$ is the most recent estimate of the channel response for subcarrier n. This frequency domain multiplication is equivalent to time domain circular convolution. However, the DMT cyclic suffix extension makes this effectively a linear convolution of the equalizer taps with the un-extended DMT symbol sample vector.

The equalizer output feeds PTCM coded quantized QAM data symbol samples plus noise to the soft de-mapper which calculates soft bit-metrics using well-known algorithms. For correct operation, the soft de-mapper must know the constellation for the current QAM symbol. For this it may rely on DMT superframe symbol sync, DMT symbol sync and the bit-loading assignment map (BL map) calculated in the calculate sysdata module 2616.

The soft bit metrics are fed to the Viterbi decoder. The Viterbi algorithm is well-known and executes soft decoding producing m−1 decoded bits per received QAM symbol. For correct operation, the Viterbi decoder must know the constellation for the current QAM symbol. For this it relies on DMT superframe symbol sync, DMT symbol sync and the bit-loading (BL) assignment map calculated in the calculate sysdata module 2616. If the bit error rate at the Viterbi decoder output is $2\times10^{-4}$ or less, then the RS decoder output will be quasi-error-free.

The derandomizer has the same structure as the transmitter randomizer of FIG. 9. The derandomizer may be synchronized to the superframe sync signal from the control module 2618 and initialized as described herein.

The deinterleaver 850 of FIG. 8 inputs derandomized data bytes and restores the original data byte ordering. It is synchronized by a signal from the control module 2618 that occurs at every Wth DMT data symbol.

Figure 28:
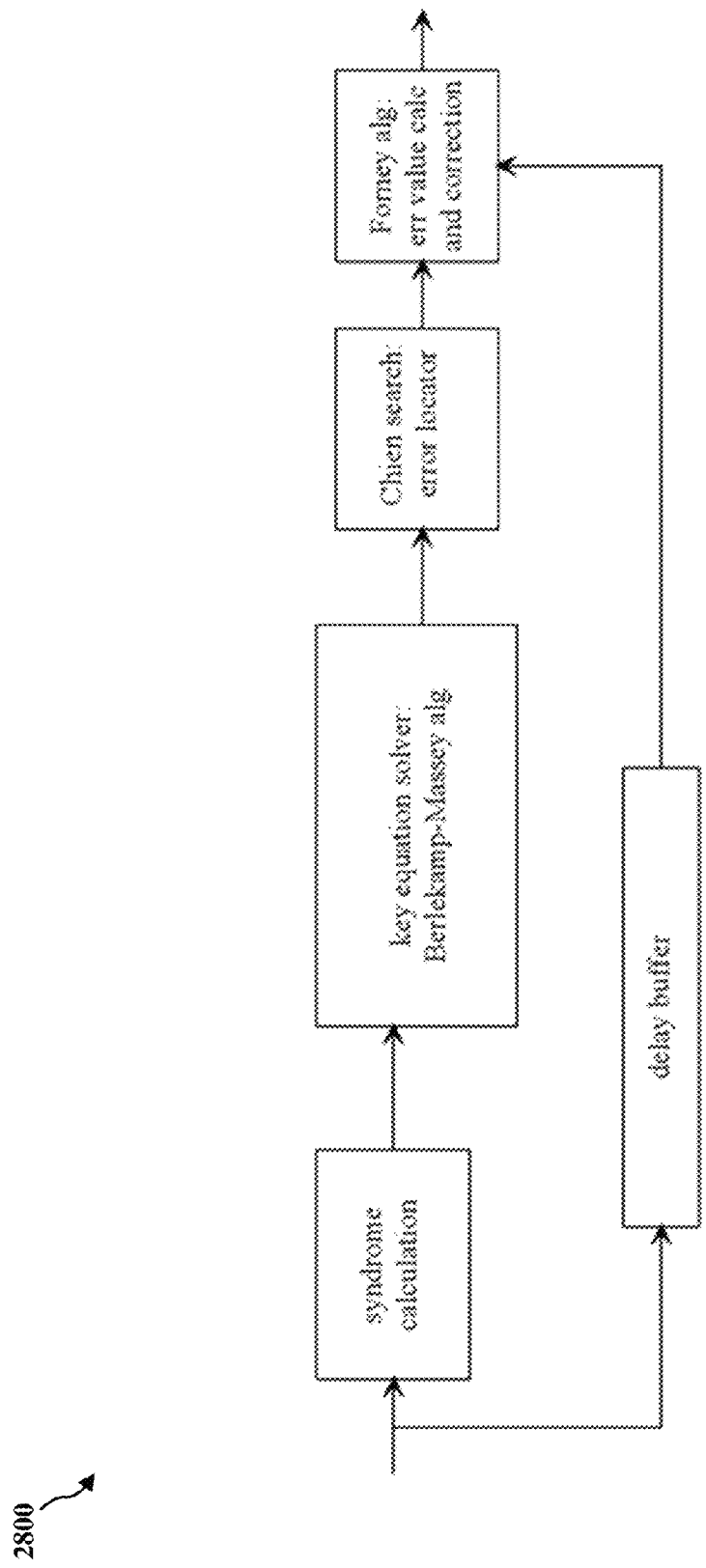
FIG. 28 is a high-level flow diagram of the Reed-Solomon decoder according to certain aspects of the invention.

The RS decoder determines the packet starting points based on a sync signal every Vth DMT data symbol and knowledge of the packet size P. The corrected bit stream output from the Viterbi decoder is packed into bytes and fed to the SLOC RS decoder. A high-level flow diagram of the RS decoder is shown in FIG. 28. A syndrome calculator views the input packet as a polynomial with the bytes as GF(256) coefficients. It calculates 2t=12 syndromes. If all are zero, the input packet is a valid codeword. Otherwise the packet is corrupted by errors. Next, the key equation solver determines the error locator and error value polynomials using, for example, the Berlekamp-Massey algorithm. A search may find the corrupted bytes by evaluating the roots of the error locator polynomial. The error values are determined and the corrupted bytes are corrected.

Figure 29:
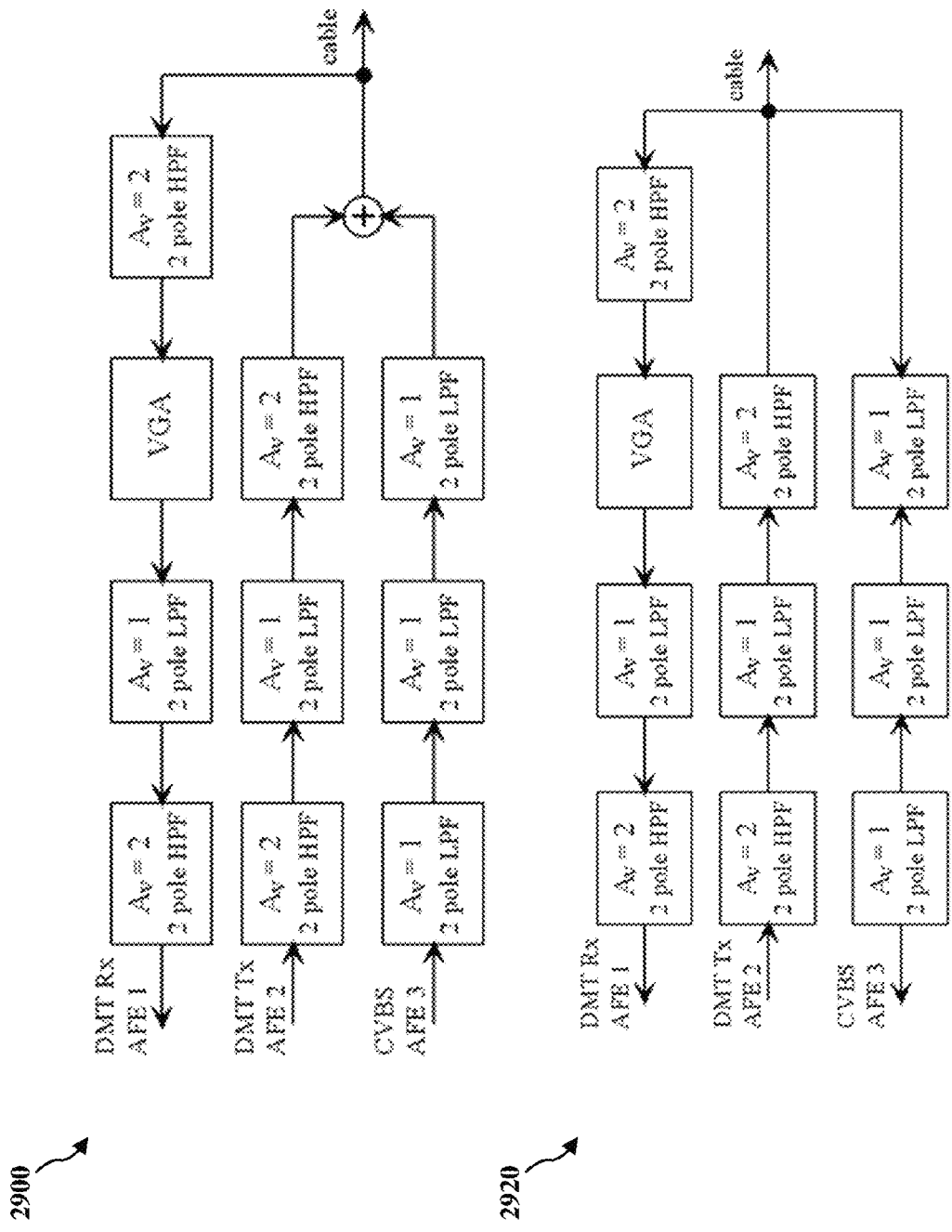
FIG. 29 illustrates analog front ends according to certain aspects of the invention.
Figure 30:
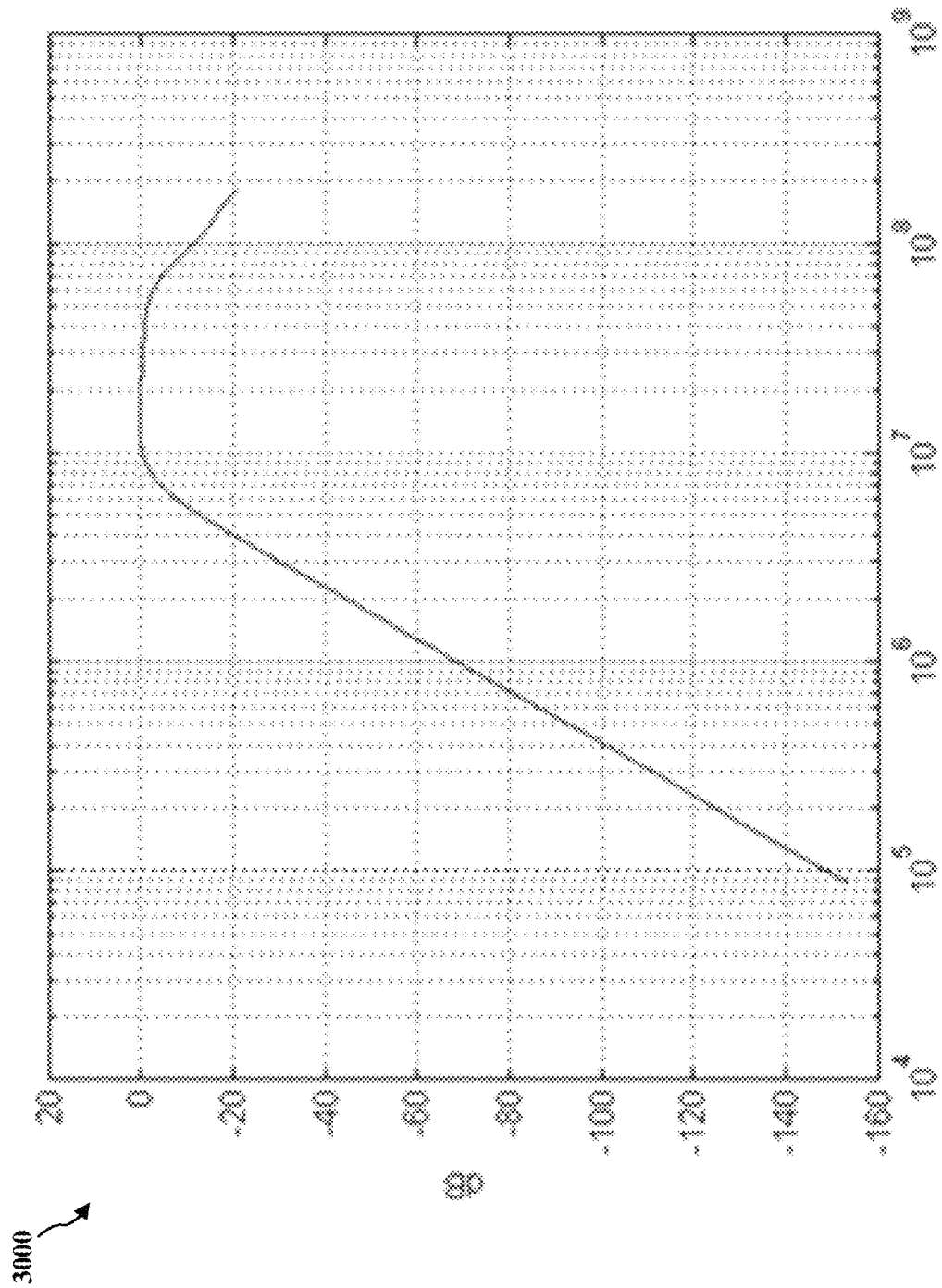
FIG. 30 shows a frequency response of a filter used in certain embodiments of the invention.

FIG. 29 shows details of the camera side AFE 2900 and DVR side AFE 2920 of FIGS. 5 and 6, respectively. For the DMT Rx path, the filtering stages comprise a BPF with a variable gain stage inserted after the first filter stage. This BPF suppresses the near CVBS signal on the low side. The DMT Tx path also uses a BPF to prevent interference into the CVBS on the low side, and image suppression on the high side (see FIG. 30). In the CVBS path the LPF reduces interference into the DMT signal. At the DVR side, the DMT filtering is similar to that of the camera side. For the CVBS path, the LPF suppresses the strong near DMT Tx.

Some IP cameras may not have a CVBS output and SLOC can take advantage of some of the available low-frequency spectrum space. Given the absence of the requirement to transmit CVBS, SLOC may also utilize increased DMT transmit power. Accordingly, the useful cable length may be extended at 100 Mbps.

Figure 31:
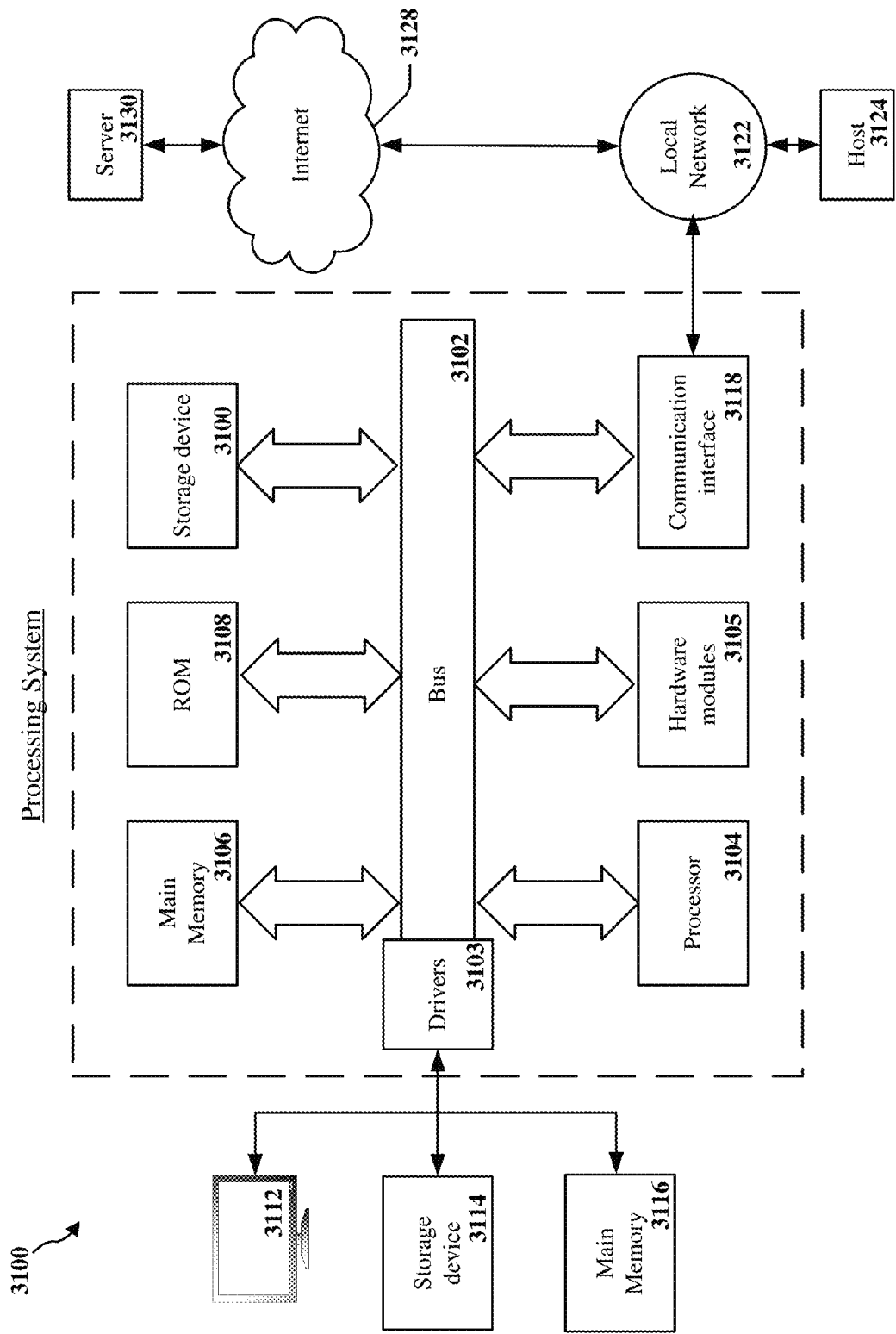
FIG. 31 is a simplified block schematic illustrating processing systems employed in certain embodiments of the invention.

Turning now to FIG. 31, certain embodiments of the invention employ a processing system 3100 deployed to perform certain of the functions described herein. Processing system 3100 may comprise a commercially available system that executes commercially available operating systems such as Microsoft Windows®, UNIX or a variant thereof, Linux, a real time operating system and or a proprietary operating system. The architecture of the processing system may be adapted, configured and/or designed for integration in the processing system, for embedding in one or more of an image capture system, a modem, a video processing workstation, a DVR, video display system, video camera and/or a router or other communications device. In one example, processing system 3100 comprises a bus 3102 and/or other mechanisms for communicating between processors, whether those processors are integral to the processing system 3100 (e.g. processor 3104 or located in different, perhaps physically separated processing systems 3100. Device drivers 3103 may provide output signals used to control internal and external components Processing system 3100 also typically comprises memory 3106 that may include non-transitory storage media such as random access memory ("RAM"), static memory, cache, flash memory, and any other suitable type of storage device that can be coupled to bus 3102. Memory 3106 can be used for storing instructions and data that can cause one or more of processors 3104 and 3105 to perform a desired process. Main memory 3106 may be used for storing transient and/or temporary data such as variables and intermediate information generated and/or used during execution of the instructions by processor 3104. Processing system 3100 also typically comprises non-volatile storage such as read only memory ("ROM") 3108, flash memory, memory cards or the like; non-volatile storage may be connected to the bus 3102, but may equally be connected using a high-speed universal serial bus (USB), Firewire or other such bus that is coupled to bus 3102. Non-volatile storage can be used for storing configuration, and other information, including instructions executed by processors 3104 and/or 3105. Non-volatile storage may also include mass storage device 3110, such as a magnetic disk, optical disk, flash disk that may be directly or indirectly coupled to bus 3102 and used for storing instructions to be executed by processors 3104 and/or 3105, as well as other information.

Processing system 3100 may provide an output for a display system 3112, such as an LCD flat panel display, including touch panel displays, electroluminescent display, plasma display, cathode ray tube or other display device that can be configured and adapted to receive and display information to a user of processing system 3100. Device drivers 3103 can include a display driver, graphics adapter and/or other modules that maintain a digital representation of a display and convert the digital representation to a signal for driving a display system 3112. Display system 3112 may also include logic and software to generate a display from a signal provided by system 3100. In that regard, display 3112 may be provided as a remote terminal, video monitor. For example, a modem may process one or more signals representative of a video stream, where the one or more signals are transmitted over a coaxial cable. An input device 3114 is generally provided locally or through a remote system and typically provides for alphanumeric input as well as cursor control 3116 input, such as a mouse, a trackball, etc. It will be appreciated that input and output can be provided to a wireless device such as a PDA, a tablet computer or other system suitable equipped to display the images and provide user input.

According to one embodiment of the invention, portions of a SLOC modem may be implemented by processing system 3100. Processor 3104 executes one or more sequences of instructions. For example, such instructions may be stored in main memory 3106, having been received from a computer-readable medium such as storage device 3110. Execution of the sequences of instructions contained in main memory 3106 causes processor 3104 to perform, or cause to be performed, process steps according to certain aspects of the invention. In certain embodiments, functionality may be provided by embedded processing systems that perform specific functions wherein the embedded systems employ a customized combination of hardware modules 3105 and software to perform a set of predefined tasks. For example, customized hardware modules 3105 may perform certain signal processing functions that would be difficult to implement in software executed on a processor 3104. Processor 3104 may comprise one or more digital signal processors that perform certain operations on received signals. Accordingly, embodiments of the invention are not limited to any specific combination of hardware circuitry and software.

The term "computer-readable medium" is used to define any medium that can store and provide instructions and other data to processor 3104 and/or 3105, particularly where the instructions are to be executed by processor 3104 and/or 3105 and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to processors 3104 and 3105 or remotely, typically by use of network connection. Non-volatile storage may be removable from processing system 3104, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EE-PROM, any other memory chip or cartridge, or any other medium from which a computer can read.

Transmission media can be used to connect elements of the processing system and/or components of processing system 3100. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 3104 and/or hardware modules 3105, which may include sequencers and custom configured logic. For example, the instructions may initially be retrieved from a magnetic disk of a remote computer and transmitted over a network or modem to processing system 3100. The instructions may optionally be stored in a different storage or a different part of storage prior to or during execution.

Processing system 3100 may include a communication interface 3118 that provides two-way data communication over a network 3120 that can include a local network 3122, a wide area network or some combination of the two. For example, an integrated services digital network (ISDN) may used in combination with a local area network (LAN). In another example, a LAN may include a wireless link. Network link 3120 typically provides data communication through one or more networks to other data devices. For example, network link 3120 may provide a connection through local network 3122 to a host computer 3124 or to a wide area network such as the Internet 3128. Local network 3122 and Internet 3128 may both use electrical, electromagnetic or optical signals that carry digital data streams.

Processing system 3100 can use one or more networks to send messages and data, including program code and other information. In the example of the Internet, a server 3130 may transmit a requested code for an application program through Internet 3128 and may receive in response a downloaded application that provides for the anatomical delineation described in the examples above. The received code may be executed by processor 3104 and/or 3105.

Figure 32:
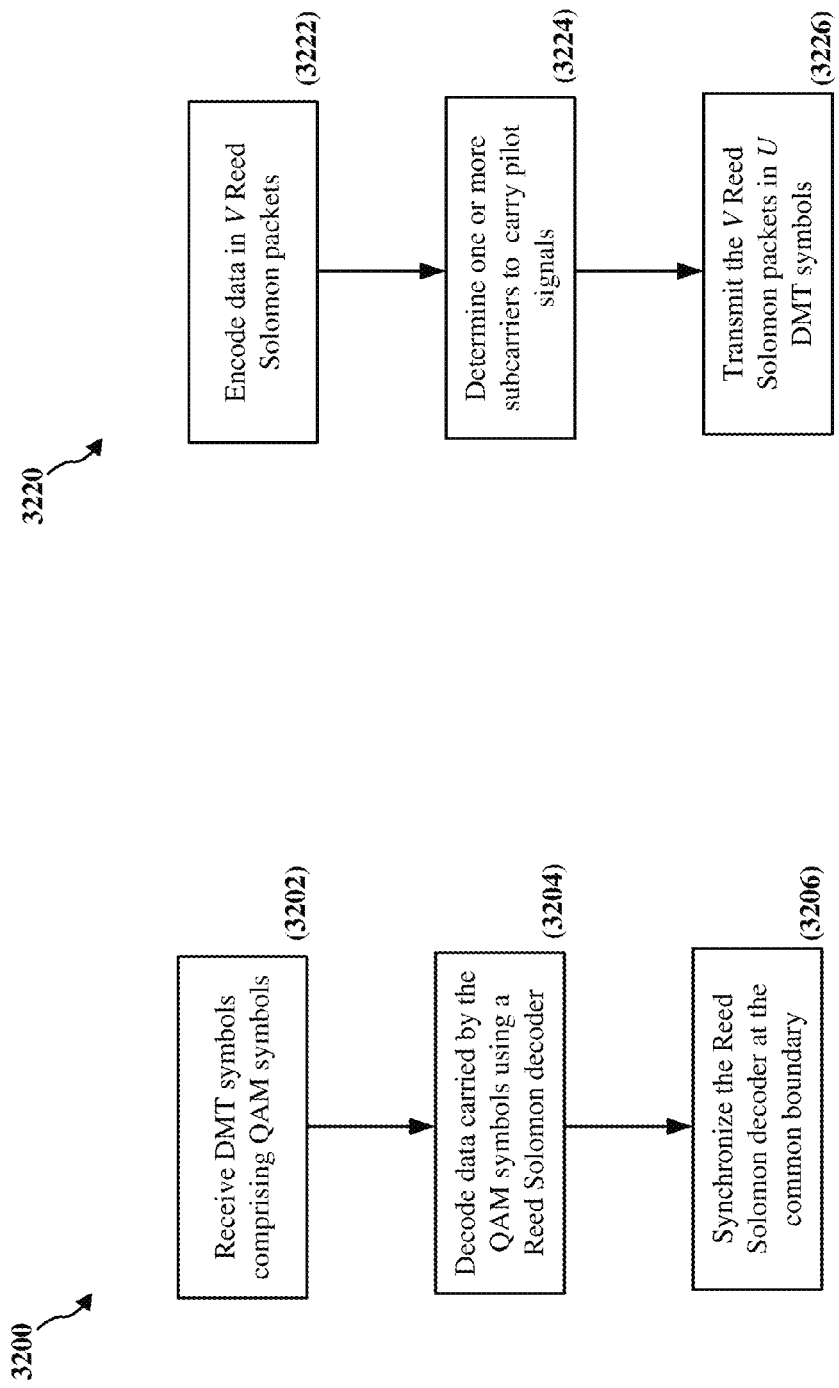
FIG. 32 includes flowcharts of methods for communication according to aspects of the invention.

FIG. 32 includes a flowchart 3200 of a method of communication according to certain aspects of the present invention. The method may be performed in a modem, and various elements of the modem may comprise a computer processor, a digital signal processor, one or more sequencers, signal processors, field programmable devices, application specific integrated circuits and/or dedicated logic. Various functional modules and/or other elements may perform one or more steps of the method. Certain functional elements are illustrated and described in regard to FIGS. 5-9, 19 and 26-29, and these modules may individually comprise combinations of the modem and software modules.

At step 3202, the modem receives DMT symbols comprising a plurality of QAM symbols. Each QAM symbol may modulate a subcarrier of a subband in a received signal. Each QAM symbol may be one of a constellation of QAM symbols assigned to the subband. The QAM constellation may be one of a plurality of QAM constellations assignable to the subband.

At step 3204, the modem decodes data carried by the QAM symbols. The data carried by the QAM symbols may be decoded using a block error detecting decoder, such as a Reed-Solomon decoder. The Reed Solomon decoder (or other block decoder) may be used to decode a first integer number (V) of code words which may be referred to herein as code blocks, and/or Reed-Solomon packets. For example, Reed-Solomon packets may be encoded in a second integer number (U) of the DMT symbols. U and V may be integers. The Reed-Solomon decoder may be configured to be synchronized at the common boundary regardless of which of the plurality of QAM constellations is assigned to the subband. A common boundary may occur at the start of each DMT symbol or at the start of each Reed-Solomon packet. V may be an integer multiple of U. A Reed-Solomon packet may commences at the start of each DMT symbol. The Reed-Solomon packet may commence at the start of each pair of the DMT symbols. In some embodiments U is an integer multiple of V, and each Reed-Solomon packet may commence at the start of a DMT symbol.

At step 3206, the Reed-Solomon decoder is synchronized at the common boundary.

In some embodiments, the modem is configured to deinterleave bytes of the data carried by the QAM symbols using a deinterleaver synchronized to a third integer number (W) of DMT symbols. In one example, the W DMT symbols correspond to a fourth number of bytes of an interleave frame associated with the received signal. The QAM constellation may be one of a plurality of QAM constellations assignable to the subband. Deinterleaving may typically be performed by a deinterleaver configured to be synchronized regardless of which of the plurality of QAM constellations is assigned to the subband.

In some embodiments, the received signal comprises a plurality of subbands. Each of the plurality of subbands may include two or more adjacent subcarriers of the received signal. Different QAM constellations may be assigned to at least two of the plurality of subbands. In one example, lower-order constellations of QAM symbols may be assigned to subbands that include higher-frequency subcarriers and higher-order constellations of QAM symbols may be assigned to subbands that include lower-frequency subcarriers. A common QAM constellation may be assigned to each of the plurality of subbands. A common constellation of QAM symbols may be assigned to a group of adjacent subbands. Different constellations of QAM symbols may be assigned to different groups of adjacent subbands. Two or more groups of adjacent subbands may comprise different numbers subbands based on signal-to-noise ratios associated with the two or more groups of adjacent subbands.

In some embodiments, the received signal is received from a coaxial cable and a lowest-frequency subcarrier included in the plurality of subbands may have a higher frequency than a baseband video signal transmitted through the coaxial cable. The DMT symbols may be transmitted through the coaxial cable in a subband of a transmitted signal.

In some embodiments, the modem estimates channel quality in the coax cable based on two or more pilots carried on a corresponding number of subcarriers in the received signal. Channel quality may include a signal to noise ratio of the coax cable, and may be related to phase shift and susceptibility to impulse noise, etc. The two or more pilots may rotate or otherwise circulate between subcarriers of the received signal. The transmitted signal and the received signal may be transmitted in adjacent time intervals.

In some embodiments, two downlink DMT symbols may be received in each of a plurality of successive downlink time intervals. Transmitting the DMT symbols through the coaxial cable may include transmitting one uplink DMT symbol in an uplink time interval that is defined after each of the plurality of successive downlink time intervals. A synchronization DMT symbol may be received. Certain operational aspects of the modem may be configured using system configuration information received in each of a plurality of frames. Each frame may include a plurality of packages. Each package may include two downlink DMT symbols and one uplink DMT symbol.

FIG. 32 includes a flowchart 3220 of a method of communication according to certain aspects of the present invention. The method may be performed in a modem, and various elements of the modem may comprise a computer processor, a digital signal processor, one or more sequencers, signal processors, field programmable devices, application specific integrated circuits and/or dedicated logic. Various functional modules and/or other elements may perform one or more steps of the method. Certain functional elements are illustrated and described in regard to FIGS. 5-9, 19 and 26-29, and these modules may individually comprise combinations of the modem and software modules.

At step 3222, the modem encodes data in an integer number (V) of Reed-Solomon packets.

At step 3224, the modem may select one or more subcarriers to carry pilot signals. The selection of pilot signals may be governed by the methods and algorithms disclosed herein. The modem may transmit two or more pilots on a corresponding number of subcarriers in the downlink signal, whereby the two or more pilots rotate or otherwise circulate between subcarriers of the downlink signal. In one example, the two or more pilots rote between the subcarriers in a pattern that repeats for each rotation. In another example, the two or more pilots may be continuously or cyclically rotated according to a pattern that may continuously change.

At step 3226, the modem transmits the V Reed-Solomon packets in an integer number (U) of DMT symbols. Each DMT symbol may comprise a plurality of QAM symbols that modulate subcarriers of a subband in a downlink signal. Each QAM symbol may be one of a constellation of QAM symbols assigned to the subband. The transmission of each of the V Reed-Solomon packets may be initiated coincident with a beginning of a DMT symbol.

In some embodiments, the modem interleaves bytes of the data using an interleaver synchronized to a third integer number (W) of DMT symbols. W may be an integer.

In some embodiments, the modem selects the QAM constellation from a plurality of QAM constellations assignable to the subband. The modem may select the QAM constellation by assigning at least one of the plurality of QAM constellations to one or more subbands based on signal-to-noise ratios associated with the one or more subbands, or based on some other indicator of channel quality. The modem may transmit the downlink signal on a coaxial cable. A lowest-frequency subcarrier included in the downlink signal may have a higher frequency than a baseband video signal communicated through the coaxial cable.

In some embodiments, the modem transmits two DMT symbols in each of a plurality of successive downlink time intervals, and receives one DMT symbol from the coaxial cable in an uplink time interval that occurs after each of the plurality of successive downlink time intervals. Thus, the modem may utilize at least a portion of the available bandwidth in a communication channel for half-duplex communications.

ADDITIONAL DESCRIPTIONS OF CERTAIN ASPECTS OF THE INVENTION

Certain embodiments of the invention provide systems and methods for communication involving video feeds. A method according to certain aspects of the invention comprises receiving a plurality of downlink symbols modulated on a subband of subcarriers in a downlink signal. A first constellation of QAM symbols assigned to the subband may be different from at least one other constellation of QAM symbols assigned to other subbands in the downlink signal. The method may comprise decoding the plurality of downlink symbols using a block error correction decoder. The block error correction decoder may be synchronized based on an identification of the first constellation of QAM symbols and information identifying boundaries between the plurality of downlink symbols.

In some embodiments, the subband is one of a plurality of subbands in the downlink signal. Each of the plurality of subbands may comprise two or more adjacent subcarriers of the downlink signal. Lower-order constellations of QAM symbols may be assigned to subbands that include higher-frequency subcarriers. Higher-order constellations of QAM symbols may be assigned to subbands that include lower-frequency subcarriers. Each constellation of QAM symbols may be assigned to a group of adjacent subbands. Two or more groups of subbands comprise different numbers of groups of subbands. The downlink signal may be received from a coaxial cable. A lowest-frequency subcarrier included in the plurality of subbands may have a higher frequency than a baseband video signal transmitted through the coaxial cable. Constellations of QAM symbols may be assigned to groups of one or more adjacent subbands based on a signal-to-noise ratio associated with the adjacent subbands of each group of adjacent subbands.

In some embodiments, the downlink signal is received from a coaxial cable. The method may comprise transmitting a plurality of uplink symbols through the coaxial cable in an uplink signal. An integer number of bytes may be encoded in each of the plurality of uplink symbols. An integer number of bytes may be encoded in each of the plurality of downlink symbols. Each of the plurality of uplink symbols may encode a different number of bytes than the number of bytes encoded by each of the plurality of downlink symbols. The subband in the downlink signal may be one of group of adjacent subbands. The group of adjacent subbands may comprise a first number of subcarriers. At least one of a plurality of other groups of subbands in the uplink signal comprises a second number of subcarriers. The first and second numbers may be different.

In some embodiments, the subband in the downlink signal comprises 32 subcarriers and at least one subband in the uplink signal comprises 4 subcarriers.

In some embodiments, the subband in the downlink signal carries two or more downlink pilots on a corresponding number of subcarriers, wherein a receiver estimates channel quality based on the pilots. Channel quality may include signal to noise ratio measured in pilots by the receiver. Subcarriers carrying the two or more pilots may be selected according to a rotation.

In some embodiments, transmitting a plurality of uplink symbols through the coaxial cable includes selecting at least one subcarrier from a subband of the uplink signal to carry an uplink pilot. Transmitting a plurality of uplink symbols may include periodically selecting a different subcarrier from the subband of the uplink signal to serve as the uplink pilot. An integer number of half bytes is encoded in the each uplink symbol and an integer number of bytes is encoded in each downlink symbol.

In some embodiments, transmitting the plurality of uplink symbols includes, for each of the plurality of uplink symbols, interleaving bytes of uplink data to obtain interleaved data, and encoding the interleaved data in the each uplink symbol using a constellation assigned to the uplink subband. Interleaving bytes of uplink data may include interleaving bytes of uplink data using a frame size determined as a function of a constellation of QAM symbols assigned to the uplink subband. A selected combination of power level and assignment of constellations of QAM symbols for each of the uplink and downlink subbands may be selected in order to provide a spectral match between the uplink and downlink subbands.

In some embodiments, the uplink signal and the downlink signal are transmitted in adjacent time intervals. Two downlink symbols are received in each of successive downlink time intervals. Transmitting a plurality of uplink symbols through the coaxial cable may include transmitting one uplink symbol after each of the successive downlink time intervals. The method may comprise receiving a downlink synchronization symbol and system configuration information in each of a plurality of frames. Each frame may include downlink intervals in which downlink symbols are received. Each of a plurality of frames may comprise 355 packages, each package including two downlink symbols and one uplink symbol. In some embodiments, the method comprises transmitting an uplink synchronization symbol in each of the plurality of frames.

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method of communication, comprising:
   encoding data in a first integer number (V) of code blocks; and
   transmitting the V code blocks in a second integer number (U) of discrete multi-tone modulation (DMT) symbols, each DMT symbol comprising a plurality of quadrature amplitude modulation (QAM) symbols that modulate subcarriers of a subband in a downlink signal, wherein each QAM symbol is one of a constellation of QAM symbols assigned to the subband,
   wherein a common boundary occurs at a start of each DMT symbol or at a start of each code block, and
   wherein the common boundary corresponds to a start point of one of the code blocks and a DMT symbol boundary.

2. The method of claim 1, wherein transmitting the V code blocks includes selecting the constellation of QAM symbols from a plurality of QAM constellations assignable to the subband.

3. The method of claim 2, wherein encoding data includes interleaving bytes of the data using an interleaver synchronized to a third integer number (W) of DMT symbols.

4. The method of claim 1, wherein selecting the constellation of QAM symbols includes assigning at least one of a plurality of QAM constellations to one or more subbands based on signal-to-noise ratios associated with the one or more subbands.

5. The method of claim 1, wherein transmitting the V code blocks includes transmitting the downlink signal on a coaxial cable, and wherein a lowest-frequency subcarrier included in the downlink signal has a higher frequency than a highest frequency assigned for transmitting a baseband video signal through the coaxial cable.

6. The method of claim 5, wherein transmitting the V code blocks includes transmitting two or more pilots on a corresponding number of subcarriers in the downlink signal.

7. The method of claim 6, wherein transmitting the two or more pilots includes circulating the two or more pilots through a plurality of subcarriers used by the downlink signal.

8. The method of claim 1, wherein transmitting the transmitting the V code blocks includes:
   transmitting two DMT symbols in each of a plurality of successive downlink time intervals; and
   receiving one DMT symbol from an uplink signal in an uplink time interval that occurs after each of the plurality of successive downlink time intervals.

9. An apparatus comprising:
   an encoder configured to encode data in code blocks;
   a transmitter configured to transmit the code blocks in discrete multi-tone modulation (DMT) symbols, each transmitted DMT symbol comprising a plurality of quadrature amplitude modulation (QAM) symbols, wherein each QAM symbol modulates a subcarrier of a subband in a transmitted signal; and a processing system configured to assign a constellation of QAM symbols to the subband in the transmitted signal based on a condition of a channel used by the transmitter, wherein each QAM symbol is one of the constellation of QAM symbols, and wherein the processing system is configured to select a number of DMT symbols to be used for transmitting each code block such that each code block has a start point that is aligned with a DMT symbol boundary.

10. The apparatus of claim 9, wherein the transmitter transmits a first integer number (V) of code blocks encoded in a second integer number (U) of the DMT symbols, wherein a common boundary occurs at a start of each DMT symbol or at a start of each code block.

11. The apparatus of claim 9, further comprising an interleaver configured to interleave bytes of data to be carried in the DMT symbols, wherein the interleaver is synchronized to a third integer number (W) of DMT symbols.

12. The apparatus of claim 9, wherein the condition of the channel used by the transmitter comprises a signal-to-noise ratio.

13. The apparatus of claim 9, further comprising
a receiver configured to receive DMT symbols from a received signal, each received DMT symbol comprising a plurality of QAM symbols of a second QAM constellation that modulate a subcarrier in a second subband; and
a block error correction decoder synchronized to boundaries of the received DMT symbols, wherein the transmitter and receiver operate at different data rates.

14. The apparatus of claim 13, wherein each of the plurality of QAM symbols comprise a first integer number (V) of code blocks encoded in a second integer number (U) of the DMT symbols, wherein a common boundary occurs at a start of each received DMT symbol or at a start of each code block, and wherein the block error correction decoder comprises a Reed-Solomon decoder synchronized to the common boundary.

15. The apparatus of claim 13, wherein the transmitted signal and the received signal are communicated through a coaxial cable, and further comprising a low pass filter configured to separate a baseband video signal from the transmitted signal and the received signal.

16. The apparatus of claim 15, wherein the processing system configured to determine the condition of the channel is based on two or more pilots in the received signal.

17. The apparatus of claim 16, wherein the two or more pilots rotate among subcarriers of the received signal.

18. The apparatus of claim 13, further comprising a deinterleaver configured to deinterleave bytes of the data carried by the QAM symbols of the received DMT symbols, wherein the deinterleaver is synchronized to a third integer number (W) of DMT symbols, wherein the W DMT symbols correspond to a fourth number of bytes of an interleave frame associated with the received signal.

19. A non-transitory computer-readable medium comprising code for:
encoding data in a first integer number (V) of Reed-Solomon packets; and
transmitting the V Reed-Solomon packets in a second integer number (U) of discrete multi-tone modulation (DMT) symbols, each DMT symbol comprising a plurality of quadrature amplitude modulation (QAM) symbols that modulate subcarriers of a subband in a downlink signal, wherein each QAM symbol is one of a constellation of QAM symbols assigned to the subband,
wherein a common boundary occurs at a start of each DMT symbol or at a start of each code block, and
wherein the common boundary corresponds to a start point of one of the code blocks and a DMT symbol boundary.

\* \* \* \* \*